United States Patent
Koponen et al.

(10) Patent No.: US 9,124,538 B2
(45) Date of Patent: Sep. 1, 2015

(54) DYNAMIC GENERATION OF FLOW ENTRIES FOR LAST-HOP PROCESSING

(71) Applicant: Nicira, Inc., Palo Alto, CA (US)

(72) Inventors: Teemu Koponen, San Francisco, CA (US); Ronghua Zhang, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 106 days.

(21) Appl. No.: 14/069,339

(22) Filed: Oct. 31, 2013

(65) Prior Publication Data

US 2015/0117454 A1    Apr. 30, 2015

Related U.S. Application Data

(63) Continuation-in-part of application No. 13/589,074, filed on Aug. 17, 2012, now Pat. No. 8,958,298, which is a continuation-in-part of application No. 13/678,518, filed on Nov. 15, 2012, now Pat. No. 8,913,611, which is a continuation-in-part of application No. 13/678,522, filed on Nov. 15, 2012.

(60) Provisional application No. 61/524,754, filed on Aug. 17, 2011, provisional application No. 61/643,339, filed on May 6, 2012, provisional application No. 61/654,121, filed on Jun. 1, 2012, provisional application No. 61/666,876, filed on Jul. 1, 2012, provisional application No. 61/560,279, filed on Nov. 15, 2011.

(51) Int. Cl.
*H04L 12/28* (2006.01)
*H04L 12/741* (2013.01)

(52) U.S. Cl.
CPC .................................... *H04L 45/74* (2013.01)

(58) Field of Classification Search
None
See application file for complete search history.

(56) References Cited

U.S. PATENT DOCUMENTS

| | | | |
|---|---|---|---|
| 2013/0044636 A1* | 2/2013 | Koponen et al. | 370/254 |
| 2013/0332983 A1* | 12/2013 | Koorevaar et al. | 726/1 |
| 2014/0068602 A1* | 3/2014 | Gember et al. | 718/1 |

* cited by examiner

*Primary Examiner* — Frank Duong
(74) *Attorney, Agent, or Firm* — Adeli LLP

(57) ABSTRACT

Some embodiments provide a method for a first managed forwarding element that implements logical forwarding elements of a logical network. The method receives a first packet from a second managed forwarding element. The first packet includes context information that indicates a logical network destination that maps to a physical destination connected to the first managed forwarding element. At the first managed forwarding element, the method dynamically generates a flow entry for processing subsequent packets received by the first managed forwarding element from the physical destination and sent to a source of the first packet. The method processes a second packet received by the first managed forwarding element from the physical destination with the dynamically generated flow entry. The dynamically generated flow entry specifies to send the second packet to the second managed forwarding element before logically forwarding the second packet through the logical network.

23 Claims, 20 Drawing Sheets

DYNAMIC GENERATION OF FLOW ENTRIES FOR LAST-HOP PROCESSING

CLAIM OF BENEFIT TO PRIOR APPLICATIONS

This application is a continuation-in-part of U.S. patent application Ser. No. 13/678,518, now published as U.S. Publication 2013/0128891, filed Nov. 15, 2012. Application Ser. No. 13/678,518 claims priority from U.S. Provisional Application 61/560,279, filed Nov. 15, 2011. This application is also a continuation-in-part of U.S. patent application Ser. No. 13/678,522, now published as U.S. Publication 2013/0132532, filed Nov. 15, 2012. Application Ser. No. 13/678,522 claims priority from U.S. Provisional Application 61/560,279, filed Nov. 15, 2011. This application is also a continuation-in-part of U.S. patent application Ser. No. 13/589,074, now published as U.S. Publication 2013/0051399, filed Aug. 17, 2012. Application Ser. No. 13/589,074 claims priority from U.S. Provisional Application 61/666,876, filed Jul. 1, 2012; U.S. Provisional Application 61/654,121, filed Jun. 1, 2012; U.S. Provisional Application 61/643,339, filed May 6, 2012; U.S. Provisional Application 61/524,754, filed Aug. 17, 2011.

BACKGROUND

Typical physical networks often use middleboxes, such as firewalls, load balancers, network address translation, intrusion detection systems, etc., to perform specific types of packet processing. Firewalls can identify traffic that should or should not be allowed to pass between network segments, network address translation can be used to hide IP addresses behind virtual IPs, and load balancers provide dynamic packet routing decisions, among other functions.

In virtualized networks, these various middleboxes do not lose their functionality. However, when logical forwarding element processing (e.g., for logical switches, logical routers) is performed entirely at the first hop, it is inefficient to send packets to centralized middlebox appliances for processing in between processing at the first hop virtualization software. However, distributing a logical middleboxes creates various problems that must be solved, including how to handle state sharing between the distributed middlebox elements that each implement the same logical middlebox on different host machines.

BRIEF SUMMARY

Some embodiments provide novel packet processing techniques within a managed network that enable first-hop processing of bi-directional stateful traffic that passes through distributed middleboxes (e.g., firewalls, load balancers, network address translators, etc.). In order to enable such traffic, some embodiments dynamically generate flow entries at one end of a connection between two managed forwarding elements. These dynamically-generated flow entries (i) resolve conflicts between two separate transport connections over the logical network that have similar or identical connection identification data and (ii) automatically forward reverse-direction traffic originating at an endpoint connected to the managed forwarding element to a different managed forwarding element at the other end of the connection before performing logical processing on the traffic.

The logical networks of some embodiments are implemented by distributing the logical processing into managed forwarding elements in the host machines at which the endpoints (e.g., virtual machines) of the network also operate. Some embodiments, as will be described in detail below, perform most or all of the logical processing of a packet at the first managed forwarding element that receives the packet (i.e., for a packet from a virtual machine, the managed forwarding element residing in the host where that virtual machine operates). Therefore, forward and reverse direction traffic for a connection will have its processing performed by different managed forwarding elements.

When the traffic passes through a middlebox that maintains state regarding the connection (e.g., an indication that a connection has begun between two virtual machines, a connection table mapping a load-balanced IP address to a server IP address, etc.), some embodiments automatically generate forwarding table entries at the receiving side of the forward-direction traffic that indicates to send reverse-direction traffic to the source side (of the forward-direction traffic) for processing. This will allow the middlebox at the source side, that has maintained the connection state information, to process the packets, as opposed to having the receiving side middlebox attempt to process the packets without having the necessary state information. Upon receiving the initial packet for a connection, the managed forwarding element at the receiving side dynamically creates a forwarding table entry for the reverse direction traffic that sends packets to the other end of the connection without performing any of the usual logical processing on the packets.

Furthermore, certain types of middleboxes may create situations in which two connections that share one endpoint may appear to the managed forwarding element (and virtual machine) at that endpoint to have the same connection-identifying data (e.g., source and destination IP addresses, source and destination transport port numbers, and transport protocol). As will be described in detail below, when source network address translation (SNAT) functionality is distributed, two different virtual machines may have their source IP addresses (and possibly transport port number) translated into the same IP address (and transport port number) for connections that both end at a same third virtual machine. While the translated source port number is randomly selected and therefore will generally be different even if two separate distributed SNAT elements select the same IP address, in some cases the SNAT elements will choose the same source IP address and port number, thereby creating a conflict if the transport protocol and destination IP address and port number are the same.

In this case, the managed forwarding element to which the third virtual machine connects will be processing packets and forwarding packets to the third virtual machine for two connections that, in certain important respects, appear identical (i.e., have the same set of characteristics defining the connection). However, because these connections are received via different tunnels, the managed forwarding element can perform conflict resolution (e.g., by modifying source IP addresses or port numbers, etc.). Thus, the third virtual machine will not receive packets from two different connections that it is unable to resolve.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
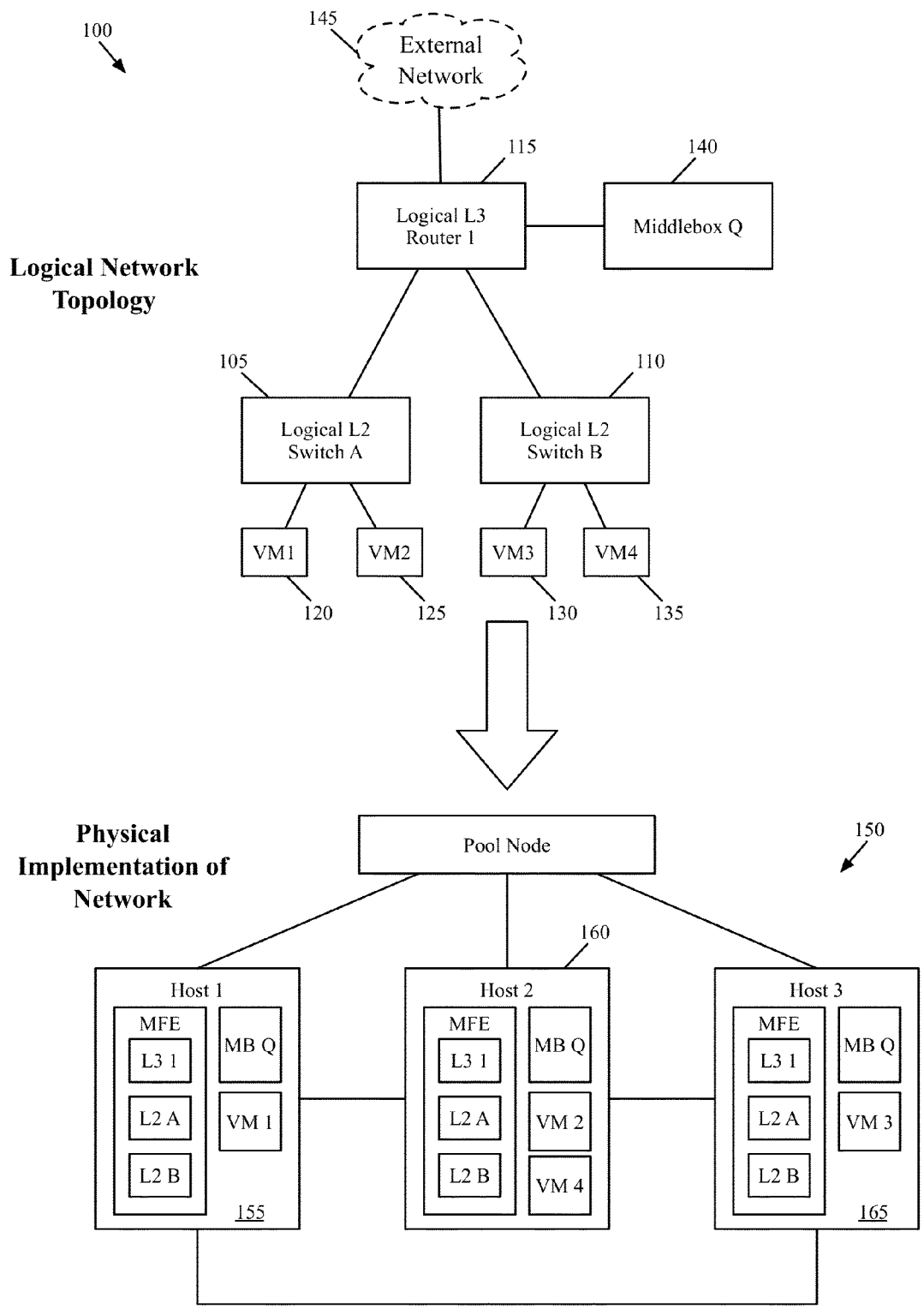
FIG. 1 conceptually illustrates a logical network topology of some embodiments, and the physical network that implements this logical network after configuration by a network control system.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide novel packet processing techniques within a managed network that enable first-hop processing of bi-directional stateful traffic that passes through distributed middleboxes (e.g., firewalls, load balancers, network address translators, etc.). In order to enable such traffic, some embodiments dynamically generate flow entries at one end of a connection between two managed forwarding elements. These dynamically-generated flow entries (i) resolve conflicts between two separate connections that have similar or identical connection identification data and (ii) automatically forward reverse-direction traffic originating at an endpoint connected to the managed forwarding element to a different managed forwarding element at the other end of the connection before performing logical processing on the traffic.

The logical networks of some embodiments are implemented by distributing the logical processing into managed forwarding elements in the host machines at which the endpoints (e.g., virtual machines) of the network also operate. Some embodiments, as will be described in detail below, perform most or all of the logical processing of a packet at the first managed forwarding element that receives the packet (i.e., for a packet from a virtual machine, the managed forwarding element residing in the host where that virtual machine operates). Therefore, forward and reverse direction traffic for a connection will have its processing performed by different managed forwarding elements.

When the traffic passes through a middlebox that maintains state regarding the connection (e.g., an indication that a connection has begun between two virtual machines, a connection table mapping a load-balanced IP address to a server IP address, etc.), some embodiments automatically generate forwarding table entries at the receiving side of the forward-direction traffic that indicate to send reverse-direction traffic to the source side (of the forward-direction traffic) for processing. This will allow the middlebox at the source side, that has maintained the connection state information, to process the packets, as opposed to having the receiving side middlebox attempt to process the packets without having the necessary state information. Upon receiving the initial packet for a connection, the managed forwarding element at the receiving side dynamically creates a forwarding table entry for the reverse direction traffic that sends packets to the other end of the connection without performing any of the usual logical processing on the packets.

Furthermore, certain types of middleboxes may create situations in which two connections that share one endpoint may appear to the managed forwarding element and virtual machine at that endpoint to have the same connection-identifying data (e.g., source and destination IP addresses, source and destination transport port numbers, and transport protocol). As will be described in detail below, when source network address translation (SNAT) functionality is distributed, two different virtual machines may have their source IP addresses (and possibly source transport port numbers) translated into the same IP address (and port number) for connections that both end at a same third virtual machine. While the translated source port number is randomly selected and therefore will generally be different even if two separate distributed SNAT elements select the same IP address, in some cases the SNAT elements will choose the same source IP address and port number, thereby creating a conflict if the transport protocol and destination IP address and port number are the same.

In this case, the managed forwarding element to which the third virtual machine connects will be processing packets and forwarding packets to the third virtual machine for two connections that, in certain important respects, appear identical (i.e., have the same set of characteristics defining the connection). However, because these connections are received via different tunnels, the managed forwarding element can perform conflict resolution (e.g., by modifying source IP addresses or port numbers, etc.). Thus, the third virtual machine will not receive packets from two different connections that it is unable to resolve.

FIG. 1 conceptually illustrates a logical network topology 100 of some embodiments, and the physical network that implements this logical network after configuration by a network control system. The network topology 100 is a simplified network for purposes of explanation. The network includes two logical L2 switches 105 and 110 connected by a logical L3 router 115. The logical switch 105 connects virtual machines 120 and 125, while the logical switch 110 connects virtual machines 130 and 135. The logical router 115 also connects to an external network 145.

In addition, a middlebox 140 attaches to the logical router 115. One of ordinary skill in the art will recognize that the network topology 100 represents just one particular logical network topology into which a middlebox may be incorporated. In various embodiments, the middlebox may be located directly between two other components (e.g., in order to process all traffic between a logical switch and a logical router irrespective of any routing policies), directly between the external network and logical router (e.g., in order to monitor and process all traffic entering or exiting the logical network), or in other locations in a more complex network.

In the architecture shown in FIG. 1, the middlebox 140 is not located within the direct traffic flow, either from one domain to the other, or between the external world and the domain. Accordingly, packets will not be sent to the middlebox unless routing policies are specified (e.g., by a user such as a network administrator) for the logical router 115 that determine which packets should be sent to the middlebox for processing. Some embodiments enable the use of policy routing rules, which forward packets based on data beyond the destination address (e.g., destination IP or MAC address). For example, a user might specify (e.g., through a network controller application programming interface (API) that all packets with a source IP address in the logical subnet switched by logical switch 105 and with a logical ingress port that connects to the logical switch 105, or all packets that enter the network from the external network 145 destined for the logical subnet switched by the logical switch 110, should be directed to the middlebox 140 for processing.

The logical network topology entered by a user (e.g., a network administrator) is distributed, through the network control system, to various physical machines in order to implement the logical network. The second stage of FIG. 1 conceptually illustrates such a physical implementation 150 of the logical network 100. Specifically, the physical implementation 150 illustrates several nodes, including a first host machine 155, a second host machine 160, and a third host machine 165. Each of the three nodes hosts at least one virtual machine of the logical network 100, with virtual machine 120 hosted on the first host machine 155, virtual machines 125 and 135 hosted on the second host machine 160, and virtual machine 130 hosted on the third host machine 165.

In addition, each of the host machines includes a managed forwarding element ("MFE"). The managed forwarding elements of some embodiments are software forwarding elements that implement logical forwarding elements for one or more logical networks. For instance, the MFEs in the hosts 155-165 include flow entries in forwarding tables that implement the logical forwarding elements of network 100. Specifically, the MFEs on the host machines implement the logical switches 105 and 110, as well as the logical router 115. On the other hand, some embodiments only implement logical switches at a particular node when at least one virtual machine connected to the logical switch is located at the node (i.e., only implementing logical switch 105 and logical router 115 in the MFE at host 155).

To implement the logical switches of the network 100, the ports of these logical switches to which the VMs 120-135 connect are mapped to physical ports (e.g., virtual interfaces) of the MFEs 155-165. In order for the VMs to send and receive data through their logical ports, they actually send the data to and receive the data from the physical ports of the MFEs to which the logical ports are mapped.

The implementation 100 of some embodiments also includes a pool node that connects to the host machines. In some embodiments, the MFEs residing on the host perform first-hop processing. That is, these MFEs are the first forwarding elements a packet reaches after being sent from a virtual machine, and attempt to perform all of the logical switching and routing at this first hop. However, in some cases a particular MFE may not store flow entries containing all of the logical forwarding information for a network, and therefore may not know what to do with a particular packet. In some such embodiments, the MFE sends the packet to a pool node 340 for further processing. These pool nodes are interior managed switching elements which, in some embodiments, store flow entries that encompass a larger portion of the logical network than the edge software switching elements.

The MFEs exchange data amongst each other and with the pool node via tunnels in some embodiments. These tunnels allow the data to be exchanged between the MFEs through other physical network elements (e.g., physical routers) without requiring the other physical network elements to be aware of the logical network. Thus, while a network controller provisions the pool node and the MFEs 155-165 with the forwarding table entries (also referred to as flow entries) that implement the logical network 100, these other physical network elements need not be managed by the controller. Various types of tunneling protocols may be used in different embodiments, including Stateless Transport Tunneling (STT), Generic Route Encapsulation (GRE), Internet Protocol Security (IPSec), and others.

Similar to the distribution of the logical switching elements across the hosts on which the virtual machines of network 100 reside, the middlebox 140 is distributed across middlebox elements on these hosts 155-165. In some embodiments, a middlebox module (or set of modules) resides on the host machines (e.g., operating in the hypervisor of the host). In some embodiments, as with the MFEs, each middlebox operating in a host machine may perform its middlebox services for multiple different logical networks. That is, a middlebox module operating in the host 155 may not only perform the middlebox services for the logical network 100, but may also be virtualized so as to perform similar services for other logical networks according to the configuration of those logical networks. These will effectively operate as two or more separate middlebox processes, such that the middlebox module or element is sliced into several "virtual" middleboxes (of the same type).

When VM 1 on host 155 sends a packet to VM 3 on host 165, the MFE at this host 155 sends the packet to the local middlebox element implementing middlebox Q on the host 155. This middlebox processes and returns the packet, in addition to storing state information regarding the connection between VM 1 and VM 3. The MFE completes its logical processing of the packet, and sends the packet to the MFE at host 165 (i.e., through the tunnel between the two MFEs).

The MFE at host 165 receives the packet and dynamically generates a flow entry for processing reverse direction packets with the same set of connection characteristics as the current packet. Normally, without this dynamically generated flow entry, the MFE at host 165 would perform most of the logical processing for a packet sent from VM 3 to VM 1, including sending the packet to the local middlebox element implementing middlebox Q on the host 165. However, this middlebox does not store the state information for the connection, which is instead maintained at the middlebox element on host 155. Accordingly, the dynamically generated flow entry automatically specifies the MFE to send the packet through the tunnel to the MFE at host 155 before the majority of the logical processing is performed.

The term "packet" is used here as well as throughout this application to refer to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

The above description introduces the dynamic flow entry generation of some embodiments. Several more detailed embodiments are described below. First, before describing the middlebox processing, Section I describes the configuration of middleboxes by the network control systems of some embodiments. Section II then describes the use of last-hop processing for reverse direction packets in logical networks with distributed middleboxes in order to avoid state sharing. Next, Section III describes resolving conflict for certain types of middleboxes that may come about as a result of avoiding state sharing. Finally, Section IV describes an electronic system with which some embodiments of the invention are implemented.

I. Configuration of Middleboxes

Before describing the packet processing techniques that enable the distribution of logical middleboxes, the configuration of these distributed middleboxes will first be described. As mentioned above, the MFEs of some embodiments implement logical switches and logical routers based on flow entries supplied to the MFEs by a network control system. The network control system of some embodiments is a distributed control system that includes several controller instances that allow the system to accept logical datapath sets from users and to configure the MFEs to implement these logical datapath sets (i.e., datapath sets defining the logical forwarding elements of the users). The distributed control system also receives middlebox configuration data from the users and configures the distributed middlebox instances by sending the configuration data to the distributed middlebox instances. The configuration of middleboxes is also described in further detail in U.S. Patent Publications 2013/0128891, 2013/0132532, and 2013/0132536, which are incorporated herein by reference.

Figure 2:
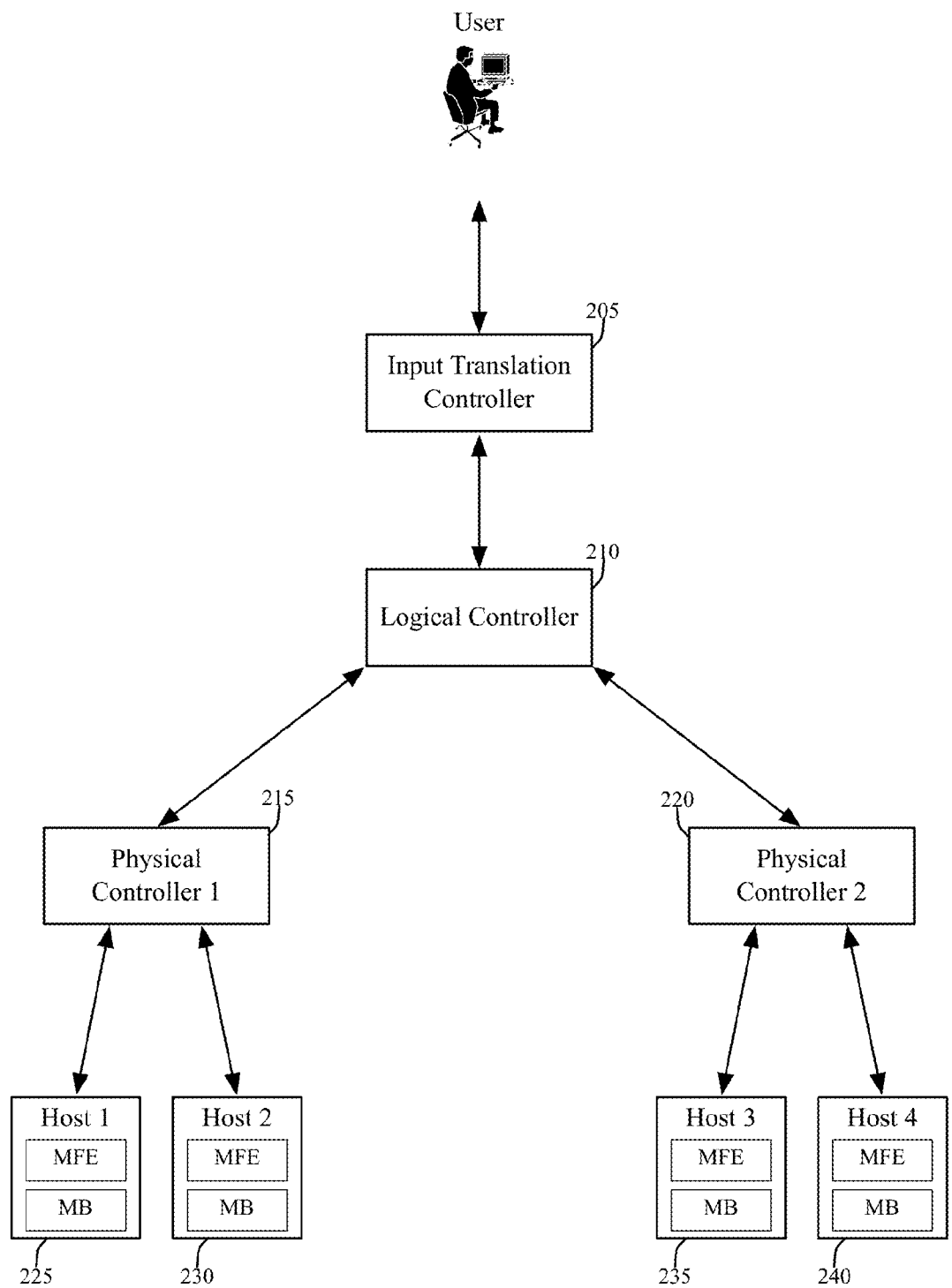
FIG. 2 illustrates a network control system of some embodiments for configuring managed forwarding elements and distributed middlebox elements in order to implement logical networks.

FIG. 2 illustrates a network control system 200 of some embodiments for configuring managed forwarding elements and distributed middlebox elements in order to implement logical networks. As shown, the network control system 200 includes an input translation controller 205, a logical controller 210, physical controllers 215 and 220, and hosts 225-240. As shown, the hosts 230-265 include both managed forwarding elements and middlebox elements. One of ordinary skill in the art will recognize that many other different combinations of the various controllers and hosts are possible for the network control system 200.

In some embodiments, each of the controllers in a network control system has the capability to function as an input translation controller, logical controller, and/or physical controller. Alternatively, in some embodiments a given controller may only have the functionality to operate as a particular one of the types of controller (e.g., as a physical controller). In addition, different combinations of controllers may run in the same physical machine. For instance, the input translation controller 205 and the logical controller 210 may run in the same computing device, with which a user interacts.

Furthermore, each of the controllers illustrated in FIG. 2 (and subsequent FIG. 3) is shown as a single controller. However, each of these controllers may actually be a controller cluster that operates in a distributed fashion to perform the processing of a logical controller, physical controller, or input translation controller.

The input translation controller 205 of some embodiments includes an input translation application that translates network configuration information received from a user. For example, a user may specify a network topology such as that shown in FIG. 1, which includes a specification as to which machines belong in which logical domain. This effectively specifies a logical data path set, or a set of logical forwarding elements. For each of the logical switches, the user specifies the machines that connect to the logical switch (i.e., to which logical ports of the logical switch the machines are assigned). In some embodiments, the user also specifies IP addresses for the machines. The input translation controller 205 translates the entered network topology into logical control plane data that describes the network topology. For example, an entry might state that a particular MAC address A is located at a particular logical port X of a particular logical switch.

In some embodiments, each logical data path is governed by a particular logical controller (e.g., logical controller 210). The logical controller 210 of some embodiments translates the logical control plane data into logical forwarding plane data, and the logical forwarding plane data into universal control plane data. Logical forwarding plane data, in some embodiments, contains of flow entries described at a logical level. For the MAC address A at logical port X, logical forwarding plane data might include a flow entry specifying that if the destination of a packet matches MAC A, to forward the packet to port X.

The universal physical control plane data of some embodiments is a data plane that enables the control system of some embodiments to scale even when it contains a large number of managed forwarding elements (e.g., thousands) to implement a logical data path set. The universal physical control plane abstracts common characteristics of different managed forwarding elements in order to express physical control plane data without considering differences in the managed forwarding elements and/or location specifics of the managed forwarding elements.

As stated, the logical controller 210 of some embodiments translates logical control plane data into logical forwarding plane data (e.g., logical flow entries), then translates the logical forwarding plane data into universal control plane data. In some embodiments, the logical controller application stack includes a control application for performing the first translation and a virtualization application for performing the second translation. Both of these applications, in some embodiments, use a rules engine for mapping a first set of tables into a second set of tables. That is, the different data planes are represented as tables (e.g., nLog tables), and the controller applications use a table mapping engine to translate between the data planes.

Each of the physical controllers 215 and 220 is a master of one or more managed forwarding elements (e.g., located within host machines). In this example, each of the two physical controllers is a master of two managed forwarding elements. In some embodiments, a physical controller receives the universal physical control plane information for a logical network and translates this data into customized physical control plane information for the particular managed forwarding elements that the physical controller manages. In other embodiments, the physical controller passes the appropriate universal physical control plane data to the managed forwarding element, which includes the ability (e.g., in the form of a chassis controller running on the host machine) to perform the conversion itself.

The universal physical control plane to customized physical control plane translation involves a customization of various data in the flow entries. For the example noted above, the universal physical control plane would involve several flow entries. The first entry states that if a packet matches the particular logical data path set (e.g., based on the packet being received at a particular logical ingress port), and the destination address matches MAC A, then forward the packet to logical port X. This flow entry will be the same in the universal and customized physical control planes, in some embodiments. Additional flows are generated to match a physical ingress port (e.g., a virtual interface of the host machine) to the logical ingress port X (for packets received from MAC A, as well as to match logical port X to the particular egress port of the physical managed forwarding element. However, these physical ingress and egress ports are specific to the host machine containing the managed forwarding element. As such, the universal physical control plane entries include abstract physical ports while the customized physical control plane entries include the actual physical ports involved.

In some embodiments, the network control system also disseminates data relating to the middleboxes of a logical network. The network control system may disseminate middlebox configuration data, as well as data relating to the sending and receiving of packets to/from the middleboxes at the managed forwarding elements and to/from the managed forwarding elements at the middleboxes.

In order to incorporate the middleboxes, the flow entries propagated through the network control system to the managed forwarding elements will include entries for sending the appropriate packets to the appropriate middleboxes (e.g., flow entries that specify for packets having a source IP address in a particular subnet to be forwarded to a particular middlebox). In addition, the flow entries for the managed forwarding element will need to specify how to send such packets to the middleboxes. That is, once a first entry specifies a logical egress port of the logical router to which a particular middlebox is bound, additional entries are required to attach the logical egress port to the middlebox.

For a distributed middlebox, the packet does not have to actually leave the host machine in order to reach the middlebox. However, the managed forwarding element nevertheless needs to include flow entries for sending the packet to the middlebox element on the host machine. These flow entries, again, include an entry to map the logical egress port of the logical router to the port through which the managed forwarding element connects to the middlebox. However, in some embodiments the middlebox attaches to a software abstraction of a port in the managed forwarding element, rather than a physical (or virtual) interface of the host machine. That is, a port is created within the managed forwarding element, to which the middlebox element attaches. The flow entries in the managed forwarding element send packets to this port in order for the packets to be routed within the host machine to the middlebox.

In some embodiments, the managed forwarding element adds slicing information to the packet. Essentially, this slicing information is a tag that indicates to which of the (potentially) several instances being run by the middlebox the packet should be sent. Thus, when the middlebox receives the packet, the tag enables the middlebox to use the appropriate set of packet processing, analysis, modification, etc. rules in order to perform its operations on the packet. Some embodiments, rather than adding slicing information to the packet, either define different ports of the managed forwarding element for each middlebox instance, and essentially use the ports to slice the traffic destined for the middlebox.

Figure 3:
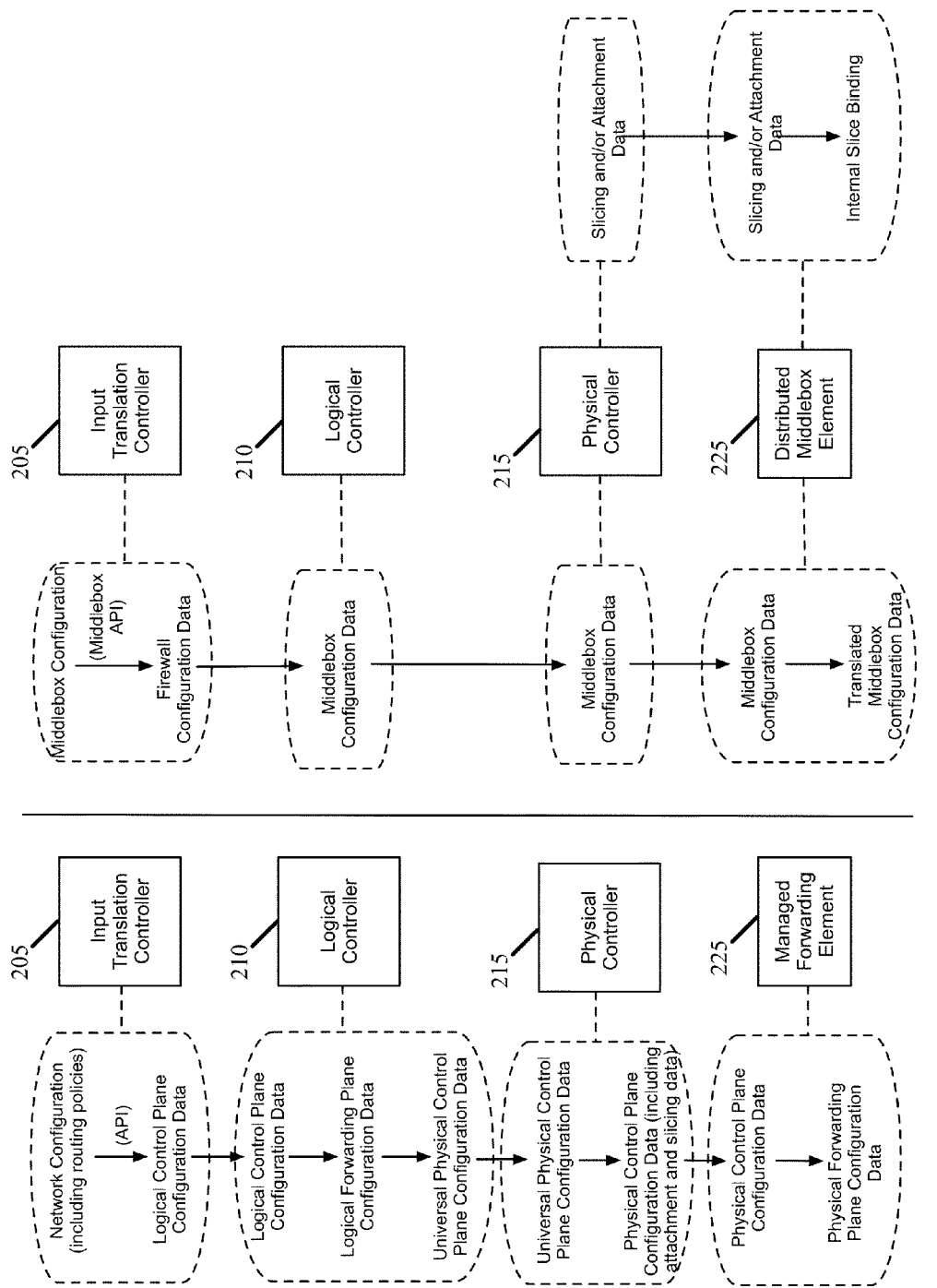
FIG. 3 conceptually illustrates the propagation of data through the network control system of some embodiments.

The above describes the propagation of the forwarding data to the managed forwarding elements. In addition, some embodiments use the network control system to propagate configuration data to the middleboxes. FIG. 3 conceptually illustrates the propagation of data through the network control system of some embodiments. On the left side of the figure is the data flow to the managed forwarding elements that implement a logical network, while the right side of the figure shows the propagation of both middlebox configuration data as well as network attachment and slicing data to the middleboxes.

On the left side, the input translation controller 205 receives a network configuration through an API, which is converted into logical control plane data. This network configuration data includes a logical topology such as that shown in FIG. 1. In addition, the network configuration data of some embodiments includes routing policies that specify which packets are sent to the middlebox. When the middlebox is located on a logical wire between two logical forwarding elements (e.g., between a logical router and a logical switch), then all packets sent over that logical wire will automatically be forwarded to the middlebox. However, for an out-of-band middlebox such as that in network topology 100, the logical router will only send packets to the middlebox when particular policies are specified by the user.

Whereas routers and switches will normally forward packets according to the destination address (e.g., MAC address or IP address) of the packet, policy routing allows forwarding decisions to be made based on other information stored by the packet (e.g., source addresses, a combination of source and destination addresses, etc.). For example, the user might specify that all packets with source IP addresses in a particular subnet, or that have destination IP addresses not matching a particular set of subnets, should be forwarded to the middlebox.

As shown, the logical control plane data is converted by the logical controller 210 (specifically, by the control application of the logical controller) to logical forwarding plane data, and then subsequently (by the virtualization application of the logical controller) to universal physical control plane data. In some embodiments, these conversions generate a flow entry (at the logical forwarding plane), then add a match over the logical data path set (at the universal physical control plane).

The universal physical control plane also includes additional flow entries for mapping generic physical ingress ports (i.e., a generic abstraction of a port not specific to any particular physical host machine) to logical ingress ports as well as for mapping logical egress ports to generic physical egress ports. For instance, for the mapping to a distributed middlebox, the flow entries at the universal physical control plane would include a forwarding decision to send a packet to the logical port to which the middlebox connects when a routing policy is matched, as well as a mapping of the logical port to a generic software port that connects to a distributed middlebox element.

The physical controller 215 (one of the several physical controllers), as shown, translates the universal physical control plane data into customized physical control plane data for the particular managed forwarding elements 230-240 that it manages. This conversion involves substituting specific data (e.g., specific physical ports) for the generic abstractions in the universal physical control plane data. For instance, in the example of the above paragraph, the port integration entries are configured to specify the physical layer port appropriate for the particular middlebox configuration. This port might be a virtual NIC if the firewall runs as a virtual machine on the host machine, or the previously-described software port abstraction within the managed forwarding element when the firewall runs as a process (e.g., daemon) within the hypervisor on the virtual machine. In some embodiments, for the latter situation, the port is an IPC channel or TUN/TAP device-like interface. In some embodiments, the managed forwarding element includes one specific port abstraction for the firewall module and sends this information to the physical controller in order for the physical controller to customize the physical control plane flows.

In addition, in some embodiments the physical controller adds flow entries specifying slicing information particular to the middlebox. For instance, for a particular managed forwarding element, the flow entry may specify to add a particular tag (e.g., a VLAN tag or similar tag) to a packet before sending the packet to the particular firewall. This slicing information enables the middlebox to receive the packet and identify which of its several independent instances should process the packet.

The managed forwarding element 225 (one of several MFEs managed by the physical controller 215) performs a translation of the customized physical control plane data into physical forwarding plane data. The physical forwarding plane data, in some embodiments, are the flow entries stored within the MFE against which the MFE actually matches received packets.

The right side of FIG. 3 illustrates two sets of data propagated to middleboxes rather than the managed forwarding elements. The first of these sets of data is the actual middlebox configuration data that includes various rules specifying the operation of the particular logical middlebox. This data may be received at the input translation controller 205 or a different input interface, through an API particular to the middlebox implementation. In some embodiments, different middlebox implementations will have different interfaces presented to the user (i.e., the user will have to enter information in different formats for different particular middleboxes). As shown, the user enters a middlebox configuration, which is translated by the middlebox API into middlebox configuration data.

In some embodiments, the middlebox configuration data is a set of records, with each record specifying a particular rule. These records, in some embodiments, are in a similar format to the flow entries propagated to the managed forwarding elements. In fact, some embodiments use the same applications on the controllers to propagate the firewall configuration records as for the flow entries, and the same table mapping language (e.g., nLog) for the records.

The middlebox configuration data, in some embodiments, is not translated by the logical or physical controller, while in other embodiments the logical and/or physical controller perform at least a minimal translation of the middlebox configuration data records. As many middlebox packet processing, modification, and analysis rules operate on the IP address (or TCP connection state) of the packets, and the packets sent to the middlebox will have this information exposed (i.e., not encapsulated within the logical port information), the middlebox configuration does not require translation from logical to physical data planes. Thus, the same middlebox configuration data is passed from the input translation controller 205 (or other interface), to the logical controller 210, to the physical controller 215.

In some embodiments, the logical controller 210 stores a description of the logical network and of the physical implementation of that logical network. The logical controller receives the one or more middlebox configuration records for a distributed middlebox, and identifies which of the various nodes (i.e., host machines) will need to receive the configuration information. In some embodiments, the entire middlebox configuration is distributed to middlebox elements at all of the host machines, so the logical controller identifies all of the machines on which at least one virtual machine resides whose packets require use of the middlebox. This may be all of the virtual machines in a network (e.g., as for the middlebox shown in FIG. 1), or a subset of the virtual machines in the network (e.g., when a firewall is only applied to traffic of a particular domain within the network). Some embodiments make decisions about which host machines to send the configuration data to on a per-record basis. That is, each particular rule may apply only to a subset of the virtual machines, and only hosts running these virtual machines need to receive the record.

Once the logical controller identifies the particular nodes to receive the records, the logical controller identifies the particular physical controllers that manage these particular nodes. As mentioned, each host machine has an assigned master physical controller. Thus, if the logical controller identifies only first and second hosts as destinations for the configuration data, the physical controllers for these hosts will be identified to receive the data from the logical controller (and other physical controllers will not receive this data).

In order to supply the middlebox configuration data to the hosts, the logical controller of some embodiments pushes the data (using an export module that accesses the output of the table mapping engine in the logical controller) to the physical controllers. In other embodiments, the physical controllers request configuration data (e.g., in response to a signal that the configuration data is available) from the export module of the logical controller.

The physical controllers pass the data to the middlebox elements on the host machines that they manage, much as they pass the physical control plane data. In some embodiments, the middlebox configuration and the physical control plane data are sent to the same database running on the host machine, and the managed forwarding element and middlebox module retrieve the appropriate information from the database.

In some embodiments, while the physical controllers do not transform the middlebox configuration records, they do provide a filtering function for distributed middlebox configuration distribution. Certain middlebox records may not have any use on a particular distributed middlebox element, and therefore the physical controller does not distribute those records to the host machine on which the particular distributed middlebox element resides. For example, if a firewall policy applies only to traffic originating at a particular VM, then that policy need only be distributed to the distributed firewall element residing on the same host as the particular VM.

In some embodiments, the middlebox translates the configuration data. The middlebox configuration data will be received in a particular language to express the packet processing, analysis, modification, etc. rules. The middlebox of some embodiments compiles these rules into more optimized packet classification rules. In some embodiments, this transformation is similar to the physical control plane to physical forwarding plane data translation. When a packet is received by the middlebox, it applies the compiled optimized rules in order to efficiently and quickly perform its operations on the packet.

In addition to the middlebox configuration rules, the middlebox modules receive slicing and/or attachment information in order to receive packets from and send packets to the managed forwarding elements. This information corresponds to the information sent to the managed forwarding elements. As shown, in some embodiments the physical controller 215 generates the slicing and/or attachment information for the middlebox (i.e., this information is not generated at the input or logical controller level of the network control system).

For distributed middleboxes, the physical controllers, in some embodiments, receive information about the software port of the managed forwarding element to which the middlebox connects from the managed forwarding element itself, then passes this information down to the middlebox. In other embodiments, however, the use of this port is contracted directly between the middlebox module and the managed forwarding element within the host machine, so that the middlebox does not need to receive the attachment information from the physical controller. In some such embodiments, the managed forwarding element nevertheless transmits this information to the physical controller in order for the physical controller to customize the universal physical control plane flow entries for receiving packets from and sending packets to the middlebox.

The slicing information generated by the physical controller, in some embodiments, contains of an identifier for the middlebox instance to be used for the particular logical network. In some embodiments, as described, the middlebox is virtualized for use by multiple logical networks. When the middlebox receives a packet from the managed forwarding element, in some embodiments the packet includes a prepended tag (e.g., similar to a VLAN tag) that identifies a particular one of the middlebox instances (i.e., a particular configured set of rules) to use in processing the packet.

As shown in FIG. 3, the middlebox translates this slicing information into an internal slice binding. In some embodiments, the middlebox uses its own internal identifiers (different from the tags prepended to the packets) in order to identify states (e.g., active TCP connections, statistics about various IP addresses, etc.) within the middlebox. Upon receiving an instruction to create a new middlebox instance and an external identifier (that used on the packets) for the new instance, some embodiments automatically create the new middlebox instance and assign the instance an internal identifier. In addition, the middlebox stores a binding for the instance that maps the external slice identifier to the internal slice identifier.

Figure 4:
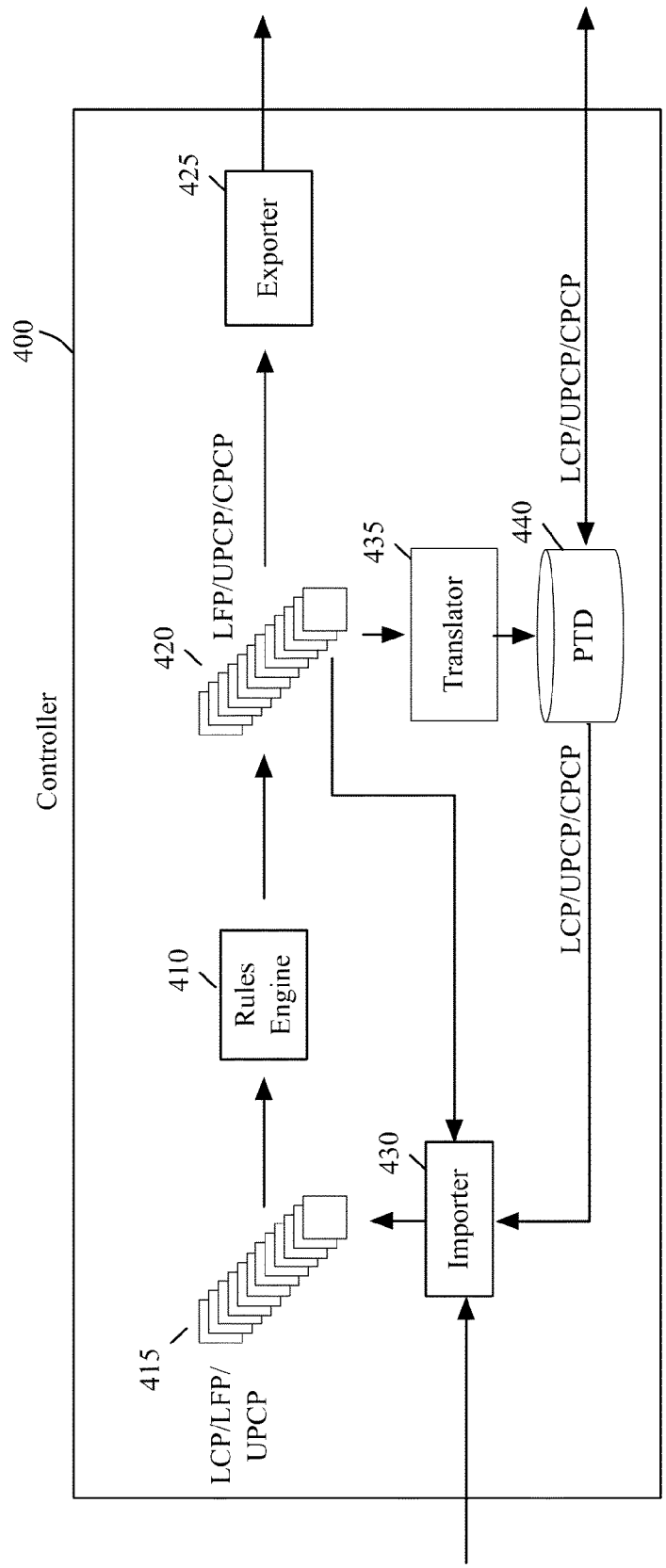
FIG. 4 illustrates example architecture of a network controller (e.g., a logical controller or a physical controller).

The above figures illustrate various physical and logical network controllers. FIG. 4 illustrates example architecture of a network controller (e.g., a logical controller or a physical controller) 400. The network controller of some embodiments uses a table mapping engine to map data from an input set of tables to data in an output set of tables. The input set of tables in a controller include logical control plane (LCP) data to be mapped to logical forwarding plane (LFP) data, LFP data to be mapped to universal physical control plane (UPCP) data, and/or UPCP data to be mapped to customized physical control plane (CPCP) data. The input set of tables may also include middlebox configuration data to be sent to another controller and/or a distributed middlebox instance. The network controller 400, as shown, includes input tables 415, a rules engine 410, output tables 420, an importer 430, an exporter 435, a translator 435, and a persistent data storage (PTD) 440.

In some embodiments, the input tables 415 include tables with different types of data depending on the role of the controller 400 in the network control system. For instance, when the controller 400 functions as a logical controller for a user's logical forwarding elements, the input tables 415 include LCP data and LFP data for the logical forwarding elements. When the controller 400 functions as a physical controller, the input tables 415 include LFP data. The input tables 415 also include middlebox configuration data received from the user or another controller in some embodiments. The middlebox configuration data is associated with a logical datapath set parameter that identifies the logical forwarding elements to which the middlebox to be is integrated.

In addition to the input tables 415, the control application 400 includes other miscellaneous tables (not shown) that the rules engine 410 uses to gather inputs for its table mapping operations. These miscellaneous tables include constant tables that store defined values for constants that the rules engine 410 needs to perform its table mapping operations (e.g., the value 0, a dispatch port number for resubmits, etc.). The miscellaneous tables further include function tables that store functions that the rules engine 410 uses to calculate values to populate the output tables 425.

The rules engine 410 performs table mapping operations that specifies one manner for converting input data to output data. Whenever one of the input tables is modified (referred to as an input table event), the rules engine performs a set of table mapping operations that may result in the modification of one or more data tuples in one or more output tables.

In some embodiments, the rules engine 410 includes an event processor (not shown), several query plans (not shown), and a table processor (not shown). Each query plan is a set of rules that specifies a set of join operations that are to be performed upon the occurrence of an input table event. The event processor of the rules engine 410 detects the occurrence of each such event. In some embodiments, the event processor registers for callbacks with the input tables for notification of changes to the records in the input tables 415, and detects an input table event by receiving a notification from an input table when one of its records has changed.

In response to a detected input table event, the event processor (1) selects an appropriate query plan for the detected table event, and (2) directs the table processor to execute the query plan. To execute the query plan, the table processor, in some embodiments, performs the join operations specified by the query plan to produce one or more records that represent one or more sets of data values from one or more input and miscellaneous tables. The table processor of some embodiments then (1) performs a select operation to select a subset of the data values from the record(s) produced by the join operations, and (2) writes the selected subset of data values in one or more output tables 420.

Some embodiments use a variation of the datalog database language to allow application developers to create the rules engine for the controller, and thereby to specify the manner by which the controller maps logical datapath sets to the controlled physical forwarding infrastructure. This variation of the datalog database language is referred to herein as nLog. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table mapping rules engine that is referred to as the nLog engine.

Some embodiments designate the first join operation that is performed by the rules engine for an input event to be based on the logical datapath set parameter. This designation ensures that the rules engine's join operations fail and terminate immediately when the rules engine has started a set of join operations that relate to a logical datapath set (i.e., to a logical network) that is not managed by the controller.

Like the input tables 415, the output tables 420 include tables with different types of data depending on the role of the controller 400. When the controller 400 functions as a logical controller, the output tables 415 include LFP data and UPCP data for the logical forwarding elements. When the controller 400 functions as a physical controller, the output tables 420 include CPCP data. Like the input tables, the output tables 415 may also include the middlebox configuration data. Furthermore, the output tables 415 may include a slice identifier when the controller 400 functions as a physical controller.

In some embodiments, the output tables 420 can be grouped into several different categories. For instance, in some embodiments, the output tables 420 can be rules engine (RE) input tables and/or RE output tables. An output table is a RE input table when a change in the output table causes the rules engine to detect an input event that requires the execution of a query plan. An output table can also be an RE input table that generates an event that causes the rules engine to perform another query plan. An output table is a RE output table when a change in the output table causes the exporter 425 to export the change to another controller or a MSE. An output table can be an RE input table, a RE output table, or both an RE input table and a RE output table.

The exporter 425 detects changes to the RE output tables of the output tables 420. In some embodiments, the exporter registers for callbacks with the RE output tables for notification of changes to the records of the RE output tables. In such embodiments, the exporter 425 detects an output table event when it receives notification from a RE output table that one of its records has changed.

In response to a detected output table event, the exporter 425 takes each modified data tuple in the modified RE output tables and propagates this modified data tuple to one or more other controllers or to one or more MFEs. When sending the output table records to another controller, the exporter in some embodiments uses a single channel of communication (e.g., a RPC channel) to send the data contained in the records. When sending the RE output table records to MFEs, the exporter in some embodiments uses two channels. One channel is established using a switch control protocol (e.g., OpenFlow) for writing flow entries in the control plane of the MFE. The other channel is established using a database communication protocol (e.g., JSON) to send configuration data (e.g., port configuration, tunnel information).

In some embodiments, the controller 400 does not keep in the output tables 420 the data for logical datapath sets that the controller is not responsible for managing (i.e., for logical networks managed by other logical controllers). However, such data is translated by the translator 435 into a format that can be stored in the PTD 440 and is then stored in the PTD. The PTD 440 propagates this data to PTDs of one or more other controllers so that those other controllers that are responsible for managing the logical datapath sets can process the data.

In some embodiments, the controller also brings the data stored in the output tables 420 to the PTD for resiliency of the data. Therefore, in these embodiments, a PTD of a controller has all the configuration data for all logical datapath sets managed by the network control system. That is, each PTD contains the global view of the configuration of the logical networks of all users.

The importer 430 interfaces with a number of different sources of input data and uses the input data to modify or create the input tables 410. The importer 420 of some embodiments receives the input data from another controller. The importer 420 also interfaces with the PTD 440 so that data received through the PTD from other controller instances can be translated and used as input data to modify or create the input tables 410. Moreover, the importer 420 also detects changes with the RE input tables in the output tables 430.

One of ordinary skill in the art will recognize that different embodiments may perform different processes or use different network control system architecture in order to provision the managed forwarding elements and distributed middlebox elements. For instance, some embodiments do not perform all of the above translations (LCP to LFP, LFP to UPCP, UPCP to CPCP) within the network controllers, but instead provide a more abstract data set to the MFEs, which use this more abstract data to generate flow entries for use in packet processing.

II. Reverse Hint

The above section describes the provisioning of managed forwarding elements and middlebox elements in order to implement a logical network within a managed network of some embodiments. This section as well as the following Section III describes certain aspects of packet processing introduced into the managed network in order to account for distributed middleboxes. When a first VM connected to a first MFE within a first host sends a packet to a second VM connected to a second MFE within a second host, some embodiments perform all of the logical processing in the first MFE. That is, the packet traverses the entire logical network (or most of the logical network) within the first MFE, via the MFE repeatedly applying matched flow entries to the packet and resubmitting the packet for further processing. When the second VM sends a reverse-direction packet to the first VM, the packet traverses the entire logical network (or most of the logical network) within the second MFE.

However, middleboxes within the logical network may maintain state used to process the packets. Specifically, a middlebox might store state information (e.g., the opening of a TCP connection, an IP address mapping for network address translation, etc.) based on a first packet and use the state information to process a second packet. Furthermore, when distributing a middlebox into the host machines along with the MFEs, there are advantages to not distributing state updates from one middlebox element to all other middlebox elements that implement a particular logical middlebox (e.g., avoiding the consumption of network bandwidth with state updates). This creates a problem, in that if packets are processed using the first hop model, the middlebox element at the second MFE will not have the requisite state information required to process the reverse-direction packets.

Some embodiments solve this problem by dynamically generating high-priority flow entries at the second MFE that send the packet to the first MFE before performing any of the logical processing (or at least before performing most of the logical processing). In some embodiments, the second MFE creates the high-priority flow entry for reverse-direction packets belonging to the same transport connection as the initial packet upon delivering the initial packet to the destination second VM.

Figure 5:
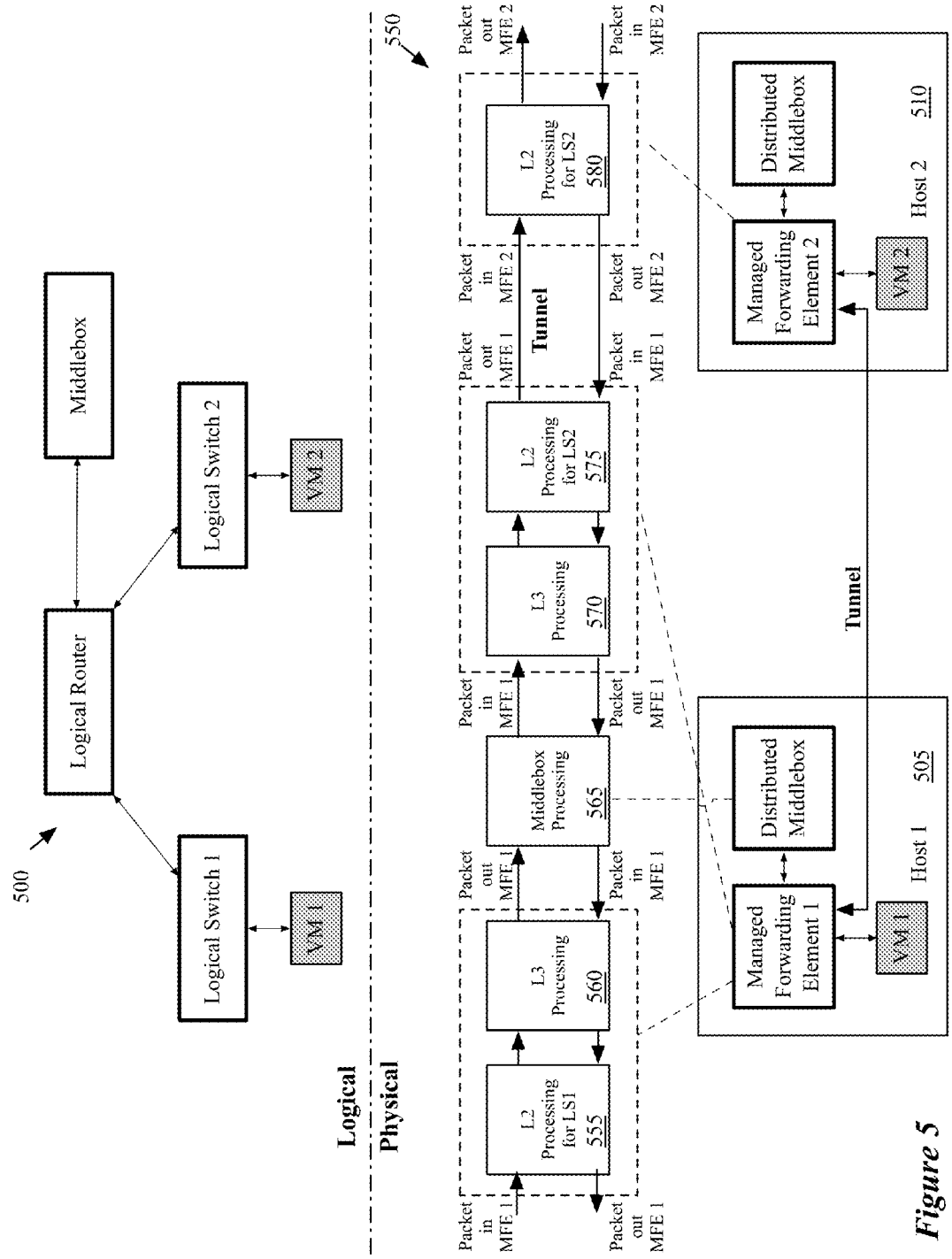
FIG. 5 illustrates an example of the packet processing to implement a logical network, that includes a middlebox, within a physical network of some embodiments.

FIG. 5 illustrates an example of the packet processing to implement a logical network, that includes a middlebox, within a physical network of some embodiments. The upper portion of FIG. 5 illustrates a logical network 500 that is similar to that shown in FIG. 1. The logical network 500 includes two logical switches connected via a logical router, with a logical middlebox connected to the logical router outside of the direct flow of traffic from one logical switch to the other. This example shows one VM connected to each logical switch, though one of ordinary skill will recognize that most logical switches will have more than one VM connected. The logical middlebox represents any middlebox that may be implemented in a distributed fashion, such as a firewall, network address translation, load balancer, etc.

The bottom portion of FIG. 5 illustrates (i) a physical implementation of this location network 500 and (ii) a packet processing pipeline 550 for packets sent in both the forward (VM1 to VM 2) and reverse (VM 2 to VM 1) direction within this physical implementation of the logical network 500. The physical implementation of the illustrated logical network includes VM 1 and VM 2 located in different hosts 505 and 510. Each of these hosts includes a managed forwarding element (MFE) to which the VM connects and a distributed middlebox connected to the MFE. As shown, the two MFEs are connected through a tunnel. Within the physical network, packets sent over this tunnel may pass through one or more non-managed physical forwarding elements (e.g., physical routers).

The packet processing pipeline 550 conceptually illustrates various operations performed by the MFEs and the distributed middlebox elements at the hosts 505 and 510 for packets sent from VM 1 to VM 2 and from VM 2 to VM 1. In this case, the connection between these two VMs originates at VM 1 in host 505 so that the forward direction packets are sent from VM 1 to VM 2 and reverse direction packets are sent from VM 2 to VM 1.

When VM 1 sends a packet addressed to VM 2, it initially sends this packet to the MFE to which it connects within its host 505. This MFE then begins its processing of the packet through the logical network. Because the VM logically connects to the first logical switch, the first stage 555 of the processing pipeline performed by the MFE is L2 processing. This L2 processing is a set of operations (defined by flow entries at the MFE) that results in a logical forwarding decision for the logical switch (i.e., a logical port of the first logical switch through which to send the packet). In some embodiments, the L2 processing includes mapping a physical (e.g., virtual) port through which the packet is received to a logical port, performing any ingress ACL operations for the logical switch, making a logical forwarding decision to send the packet out of a particular logical port of the logical switch, and performing any egress ACL operations for the logical switch. In this case, the logical forwarding decision sends the packet to the logical router (because the destination VM is attached to a different logical switch, the destination MAC address will be that of the logical router port), which is also implemented by flow entries within the MFE.

The MFE within host 505 then performs the L3 processing stage 560 of the logical processing pipeline. This L3 processing is a set of operations (defined by flow entries at the MFE) that results in a logical forwarding decision for the logical router (i.e., a logical port of the logical router through which to send the packet). As with the L2 processing, this L3 processing stage 560 may involve several sub-stages, including ingress and/or egress ACL operations. The logical forwarding decision in this case sends the packet through the logical port of the router to which the middlebox element in the host 505 attaches. While the packet's destination IP address is generally not that of the middlebox element, various high-priority routing policies may be implemented by the flow entries to send the packet to the middlebox element.

At this point, because the forwarding decision sends the packet to the middlebox (which is not implemented by the MFE), the packet is sent out of the port of the MFE that connects to the middlebox element. In some embodiments, this port is a software abstraction within the host machine. Next, the middlebox element in the host 505 performs its middlebox processing 565 on the packet. This may be firewall processing (e.g., determining whether to drop the packet), SNAT or DNAT processing to translate the source or destination IP address, etc. After the middlebox processing is complete, the middlebox sends a new packet to the MFE via the connection between the two software elements. This new packet, in some embodiments, reflects any changes made by the middlebox (e.g., a new source address or destination address, etc.).

The MFE receives this new packet at a port associated with a logical port of the logical router, and therefore begins by applying logical L3 processing at the next stage 570. In this case, because the packet arrives from the logical port connected to the middlebox, the routing policies that previously sent the packet to the middlebox do not apply. Thus, the logical L3 forwarding decision sends the packet to the second logical switch, also implemented by the flow entries in the first MFE at host 505. As shown, the MFE performs this L2 processing stage 575, which results in the logical forwarding decision to send the packet to the logical port to which the VM 2 connects. Based on this decision, the MFE in host 505 sends the packet to the MFE in host 510 via a tunnel between the two MFEs.

When the packet arrives at the second MFE in host 510, the packet is encapsulated with the tunnel header and indicates the destination logical port on the second logical switch. Thus, the only remaining processing at the second MFE for the forward direction packet involves identifying the logical egress port and delivering the packet through this port to the destination VM 2, to complete the logical processing for the second logical switch at stage 580. In some embodiments, L2 egress ACL operations, or additional processing for the second logical switch, is performed by the second MFE in host 510.

In addition, upon delivering the packet, the second MFE dynamically creates a high-priority flow entry or set of flow entries that causes the second MFE to send certain packets received from the second VM (i.e., through the port to which the second VM is attached) to the first MFE for logical processing rather than performing the logical processing in the second VM. In some embodiments, this "reverse hint" flow entry is created according to a pre-existing flow entry on the second MFE. In some embodiments, the pre-existing flow entry is matched when a packet is for a new connection between a local VM (i.e., connected to the particular MFE) and a VM on a different logical switch, with the local VM as the destination of the packet initiating the connection. This flow entry then specifies as an action to create a new high-priority flow entry in the forwarding table that sends packets for the connection received from the local VM over the tunnel to the first MFE in host 505. In some embodiments, the connection is identified using a five-tuple of {source IP address, destination IP address, source port, destination port, transport protocol type}. In addition, some embodiments specify a sixth characteristic to match over, used when connection 5-tuples may conflict (as described in detail in Section III below). While these packets will match other flow entries in the forwarding tables of the second MFE at host 510, the dynamically created flow entry is assigned a higher priority so that its actions, to send the packet via the tunnel, will be performed first.

FIG. 5 also illustrates the processing pipeline for the reverse direction packets sent from VM 2 to VM 1. When VM 2 sends a packet, the second MFE at its local host 510 begins to perform the logical L2 processing (e.g., mapping the physical (i.e., virtual) ingress port of the packet to a logical port of the second logical switch). Specifically, in some embodiments the second MFE performs the logical ingress portion of the pipeline. However, the packet quickly matches the dynamically generated flow entry which specifies to send the packet via the tunnel to the first MFE at host 505 before any of the egress processing is performed for logical switch 2. The reverse direction processing is then performed at the MFE 505 for stages 575 and 570. At the logical routing stage 570, the MFE makes a forwarding decision to send the packet to the middlebox element located locally at the host 505.

The middlebox element will have stored state information about the connection (e.g., a number of packets sent in each direction, a real IP to virtual IP address mapping, a connection opening status, etc.), and therefore can process the packet correctly. Were the packet processed by the middlebox element located on host 510, this state would not be present and could result in the incorrect action being taken by the middlebox. Instead, the same middlebox element that processes the forward direction packets (the middlebox element at the first hop for the forward direction packets) also processes the reverse direction packets (this middlebox being at the last hop for the reverse direction packets). This eliminates the need for the middlebox elements to share state among each other, which would unnecessarily add traffic to the network.

In some embodiments, the middlebox element at the first host actually generates a flow entry (e.g., by filling in values in a flow template) when processing the initial packet for the connection. This flow entry enables the MFE to perform the middlebox processing of stage 565 on a packet without sending the packet to the middlebox element. For instance, when the distributed middlebox performs NAT functionality, the middlebox element generates two flow entries in some embodiments, one for each direction. For a source NAT middlebox, the first flow entry translates the source IP address of forward direction packets and the second flow entry translates the destination IP address of reverse direction packets. To dynamically generate these flow entries, in some embodiments the middlebox fills in values for a flow template. The flow template of some embodiments is a blank flow entry provided to the middlebox. For the source NAT example, the middlebox element fills in the IP addresses that are matched as well as the action to change the IP address (the match may be over additional parameters, such as source and destination port, logical forwarding element, transport protocol, etc.).

In the example shown in FIG. 5, after the middlebox processing is completed for reverse direction packets, the middlebox element sends a packet to the MFE at the first host 505, which performs additional L3 processing at stage 550. This sends the packet to the first logical switch, which delivers the packet to VM 1.

Figure 6:
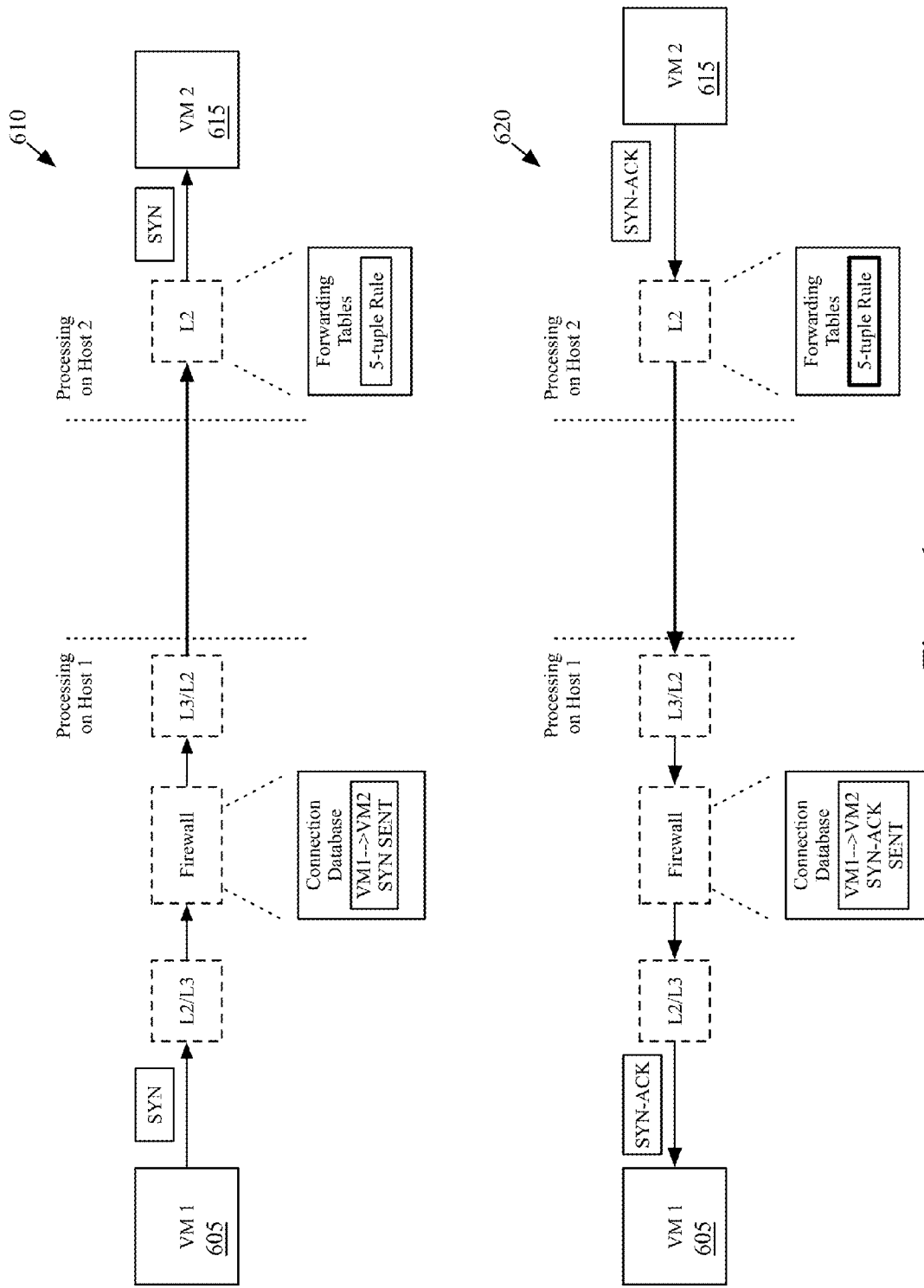
FIG. 6 illustrates the opening of a TCP connection through a firewall.
Figure 7:
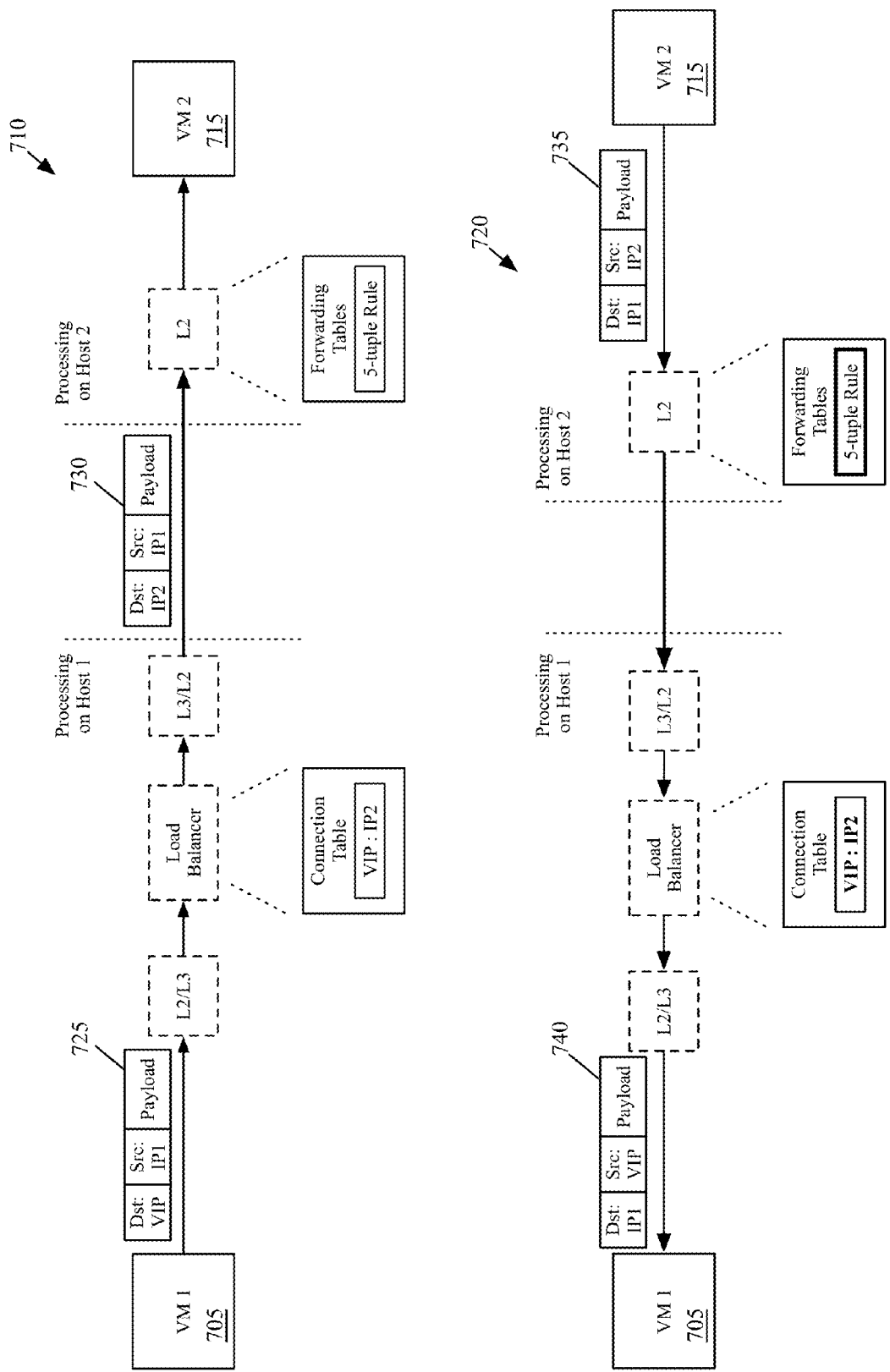
FIG. 7 illustrates a load balancer that translates a virtual IP to a real IP (and vice versa for return packets).
Figure 8:
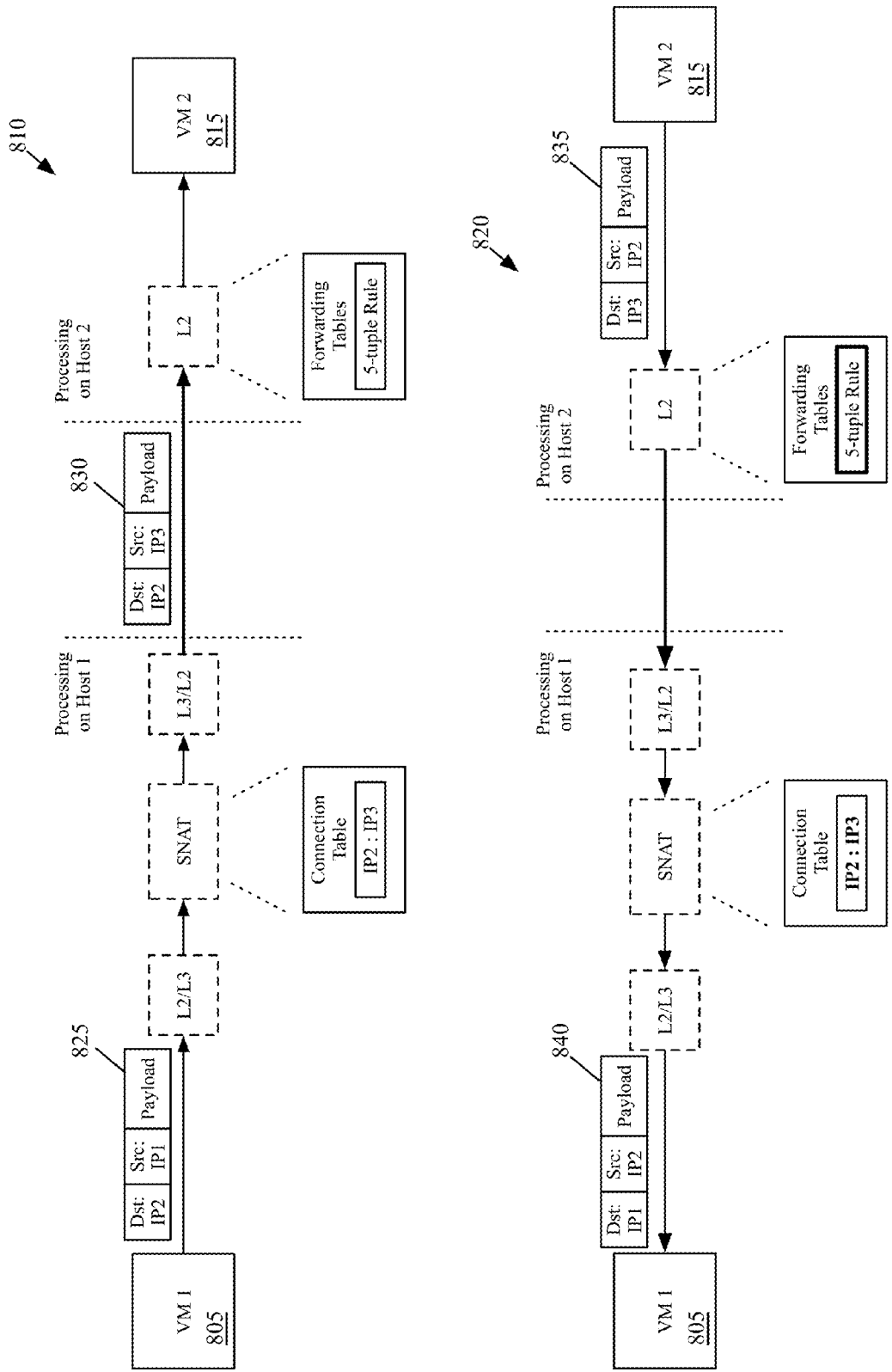
FIG. 8 illustrates a SNAT that translates source IP addresses in the forward direction (and therefore destination IP addresses in the reverse direction).

The above illustrates in detail the processing for forward and reverse direction packets with a generic middlebox element. The following FIGS. 6-8 illustrate specific situations in which the last-hop processing for reverse direction packets becomes important due to the use of connection state by the middleboxes. Specifically, FIG. 6 illustrates the opening of a TCP connection through a firewall, FIG. 7 illustrates a load balancer that translates a virtual IP to a real IP (and vice versa for return packets), and FIG. 8 illustrates a SNAT that translates source IP addresses in the forward direction (and therefore destination IP addresses in the reverse direction).

FIG. 6 conceptually illustrates the opening of a TCP connection between two VMs 605 and 615 that reside on different switches in a logical network. In this example, a firewall processes the packets sent between the VMs. A first stage 610 illustrates the sending of a SYN packet from the first VM 605 to the second VM 615, while a second stage 620 illustrates the sending of a SYN-ACK packet from the second VM 615 to the first VM 605 in response to the SYN packet.

As shown, the VM 605, acting as a client in this scenario, sends a SYN packet directed to the second VM 615, acting as a server, in order to open a TCP connection. The packet is processed by the MFE at the host of the VM 605, which performs L2 and L3 processing, and routes the packet to the logical firewall based on one or more routing policies (e.g., because the packet is a SYN packet, because the packet is sent from a particular logical switch, etc.). The firewall determines whether to let the SYN packet through based on its configuration settings as set by the administrator of the logical network. Assuming that the packet is allowed, the firewall sends the SYN packet back to the MFE for additional L3 and L2 processing. In addition, as shown, the distributed firewall element stores in its local connection database the state of this TCP connection opening (i.e., that a SYN packet has been sent).

After determining the destination logical port for the packet, the MFE local to the first VM 605 sends the packet through a tunnel (i.e., through the physical network) to the MFE local to the second VM 615. This MFE performs L2 processing to deliver the packet to the second VM 615. In addition, the MFE dynamically generates a new flow entry to ensure that return packets are sent to the first MFE for logical processing after the initial ingress L2 processing (i.e., the opposite of the egress L2 processing performed to deliver the packet to the destination VM 615). In some embodiments, this new flow entry matches over a 5-tuple for packets received from the particular physical port to which the VM 615 connects, or from the logical port corresponding to this physical port after the L2 ingress processing has been performed. When a packet is received at this particular physical port and matches the 5-tuple of {source IP address, destination IP address, source port, destination port, and transport protocol}, the flow entry specifies for the MFE to encapsulate the packet in the tunnel between the two MFEs and send the packet out over that tunnel.

The second stage 620 illustrates the VM 615 sending a return SYN-ACK packet, the next step in a TCP connection opening handshake. Initially, the local MFE performs ingress L2 processing to map the SYN-ACK packet to a logical port of the logical switch. The packet then matches the 5-tuple rule in the forwarding tables of the local MFE, and therefore the packet is sent through the tunnel to the MFE local to the first VM 605 before any logical forwarding decisions are made. While the packet matches other flow entries at the second MFE local to VM 615 (i.e., the logical switch processing entries), the 5-tuple reverse hint flow entry has a higher priority than these others and therefore is matched and acted upon first.

Thus, the MFE local to the first VM 605 receives the return SYN-ACK packet and begins processing it. The L3 forwarding decision for this packet sends the packet to the firewall element located locally at the host machine. The firewall has connection information stored indicating that a SYN packet has recently been sent from the first VM 605 to the second VM 615, and therefore allows the SYN-ACK response packet. Were the SYN-ACK packet processed by the firewall element located on the second host, this firewall would not have the state information that a SYN packet had previously been sent, and therefore would block the packet as an impermissible response. By using the reverse hint to send the packet back to the first host for processing, the system prevents this situation without the need to share state information between the distributed firewall elements.

Instead, the firewall element local to the VM 605 identifies that the SYN packet was recently sent in the forward direction, and therefore the reverse direction SYN-ACK packet is permissible. Subsequently, when the first VM 605 sends a ACK packet, the local firewall element will recognize this as the appropriate next packet in the sequence and allow the packet through. In addition, the firewall element will recognize that the connection between the VMs 605 and 615 is open and will allow packets to be sent in both directions.

FIG. 7 conceptually illustrates the use of a reverse hint for packets sent from a first VM 705 through a load balancer to a second VM 715 that resides on a different logical switch in a logical network. In this example, the load balancer processes packets sent to a particular virtual IP and balances these packets among several servers, of which the second VM 715 is one. A first stage illustrates a packet sent from the client VM 705 to the server VM 715, while the second stage 720 illustrates a return packet from the server VM 715 to the client VM 705.

As shown, the client VM 705 sends a packet 725 to its local MFE. This packet 725 has a payload, a source IP address, and a destination IP address. This payload might be a SYN packet to open a TCP connection, a UDP packet, etc. The source IP address in this case is the client's IP address (IP1), and the destination IP address is a virtual IP address that the client knows for a server that it wants to reach. Upon the packet reaching the local MFE, the MFE performs logical L2 and L3 processing, which routes the packet to the load balancer based on the destination virtual IP address. The load balancer selects one of several servers to which the virtual IP address maps, in this case the VM 715. The load balancer also stores this mapping in its connection table, so that all packets for the opened connection will be sent to and from the same server VM 715. The load balancer element then sends a new packet 730 back to the local MFE, with the destination IP address modified to be that of the server VM 715 (IP2). This packet 730 is shown on the tunnel between the two MFEs, though the additional encapsulation of the tunnel header is not illustrated.

The local MFE at the host of the client VM 705 sends the packet through the tunnel to the MFE at the host on which the server VM 715 is located. As in the previous example, the MFE at the second host delivers the packet to its local VM, and generates a reverse hint flow entry. This reverse hint flow entry operates in the same manner as the firewall example of FIG. 6. That is, the flow entry is matched based on the 5-tuple of {source IP address, destination IP address, source port, destination port, transport protocol} after ingress L2 processing in some embodiments, and specifies to immediately encapsulate the packet in the tunnel and send the packet to the MFE at the client VM 705.

The second stage 720 illustrates the reverse direction packet. This packet has its source IP as the real IP of the server VM 715 (IP2) and the destination IP as the IP of the client VM 705 (IP1). The server VM 715 sends a packet 735 to its local MFE, which initially performs L2 ingress processing to map the packet 735 to a logical port of a logical switch. At this point, the packet matches the high-priority reverse hint flow entry and the MFE sends the packet over the tunnel to the other MFE. After the initial L2 and L3 processing, the load balancer processing identifies that the packet matches its connection table. The load balancer modifies the source IP to the virtual IP address so that the client VM 705 will recognize the source, and sends the modified packet 740 back to the MFE for its additional processing and delivery to the client VM 705.

In some embodiments, this load balancer processing is performed by flow entries at the MFE that the load balancer generates using flow templates. As mentioned above, the distributed load balancer of some embodiments automatically generates flow entries when processing the initial packet, which specify (i) to convert the destination address of packets in the forward direction that match the connection 5-tuple and the source port of the client VM 705 from a virtual IP address to the real IP address for the selected server VM 715 and (ii) to convert the source address of packets in the reverse direction that arrive via the particular tunnel port and match the connection 5-tuple from the real IP address of the selected server VM 715 to the virtual IP address.

FIG. 8 conceptually illustrates a similar scenario to that of FIG. 7, in which the middlebox processing performs source network address translation (SNAT). As with the previous figure, FIG. 8 illustrates two stages: a first stage 810 in which a first VM 805 sends a forward direction packet to a second VM 815, and a second stage in which the second VM 815 sends a reverse direction packet to the first VM 805.

As shown, the first VM 805 sends a packet 825 to its local MFE, which performs logical L2 and L3 processing and sends the packet to the distributed SNAT element local to the MFE. This packet 825 has a payload, a source IP address (IP1), and a destination IP address (IP2). The SNAT element selects from a pool of IP addresses that the VMs on the logical switch expose to the outside world, and chooses IP3 for the new source address. In some embodiments, the SNAT element also modifies the source transport port number for the packet, in addition to the source IP address. The SNAT element stores this mapping in its connection table, so that all packets for the transport connection between the two VMs will be properly translated. The SNAT element then sends a new packet 830 to the local MFE, with the source IP address modified to be IP3. This packet 830 is shown on the tunnel between the two MFEs, though the additional encapsulation of the tunnel header is not illustrated.

The local MFE at the host of the first VM 805 sends the packet through the tunnel to the MFE at the host on which the second VM 815 is located. As in the previous examples, the MFE at the second host delivers the packet to its local VM, and generates a reverse hint flow entry. This reverse hint flow entry, in some embodiments, operates in the same manner as the firewall and load balancer examples. That is, the flow entry is matched based on the 5-tuple of {source IP address, destination IP address, source port, destination port, transport protocol} after ingress L2 processing in some embodiments, and specifies to immediately encapsulate the packet in the tunnel and send the packet to the MFE at the first VM 805.

The second stage 820 illustrates the reverse direction packet. This packet has as its destination IP address the address chosen by the SNAT element (IP3), and the source IP is that of the second VM 815 (IP2). The second VM 815 sends this packet 835 to its local MFE, which initially performs ingress L2 processing to map the packet 835 to a logical port of a logical switch. At this point, the high-priority reverse hint flow entry is matched and the MFE sends the packet over the tunnel to the other MFE. After the initial L2 and L3 processing, the SNAT processing identifies that the packet matches its connection table. The SNAT modifies the destination IP to the actual IP address for the first VM 805, and sends the modified packet 840 back to the MFE for its additional processing and delivery to the VM 805.

In some embodiments, this SNAT processing is performed by flow entries at the MFE that the SNAT element generates using flow templates. As mentioned above, the distributed SNAT of some embodiments automatically generates flow entries when processing the initial packet, which specify to (i) convert the source IP of forward direction packets that match the connection 5-tuple and the source port of the first VM 805 from the real IP address of that first VM (IP1) to the selected address (IP3), and (ii) to convert the destination IP of reverse direction packets that arrive via the particular tunnel port and match the connection 5-tuple from the selected address to the real IP address for delivery to the first VM 805.

III. Conflict Resolution

As mentioned above, one of the middlebox services that may be provided in a distributed manner in logical networks of some embodiments is a SNAT service. When providing the SNAT service, the middlebox replaces a source network address (e.g., the source IP address) with a different source network address in order to hide the real source network address from the recipient of the packet.

However, the distributed SNAT middlebox has the potential to encounter a problem in some embodiments, in which a single VM receives conflicting packets from two different real sources having the same network address. If a first VM sends a packet to a second VM, the local SNAT may translate the IP address of the first VM into a particular address. In some embodiments, the SNAT (or SNATP) assigns a source transport port number in addition to the IP address. This source port number may be assigned at random in some embodiments. When a third VM, on the same subnet as the first VM but located at a different host, sends a packet to the second VM, the local SNAT element of the different host will perform its SNAT processing. In some cases, the SNAT element will select the same address and transport port number, in which case the second VM will see packets coming from two different sources (i.e., two different tunnels) but having the same source address and port number, and therefore having the same transport connection 5-tuple unless the transport protocol or destination port number are different.

One way to avoid this problem is to have a central manager (e.g., the network controllers) partition the source network address pool among the various SNAT elements. However, doing so would impose strict requirements around the lifecycle management of addresses within these pools. Because no assumptions could be made regarding the active time for both the VMs and the connections, these pools might need to be scaled up and down very rapidly. Central assignment of source transport port numbers is even more difficult in some embodiments due to the high speed required.

Instead, the MFE at the destination performs conflict resolution in some embodiments, to differentiate the connections. In some embodiments, this conflict resolution involves high-priority flow entries for both forward and reverse direction packets that modify packets for one of the two connections before sending the modified packets to the destination VM, and the perform the reverse modification on the return packets before the reverse hint flow entry is matched.

Figure 9:
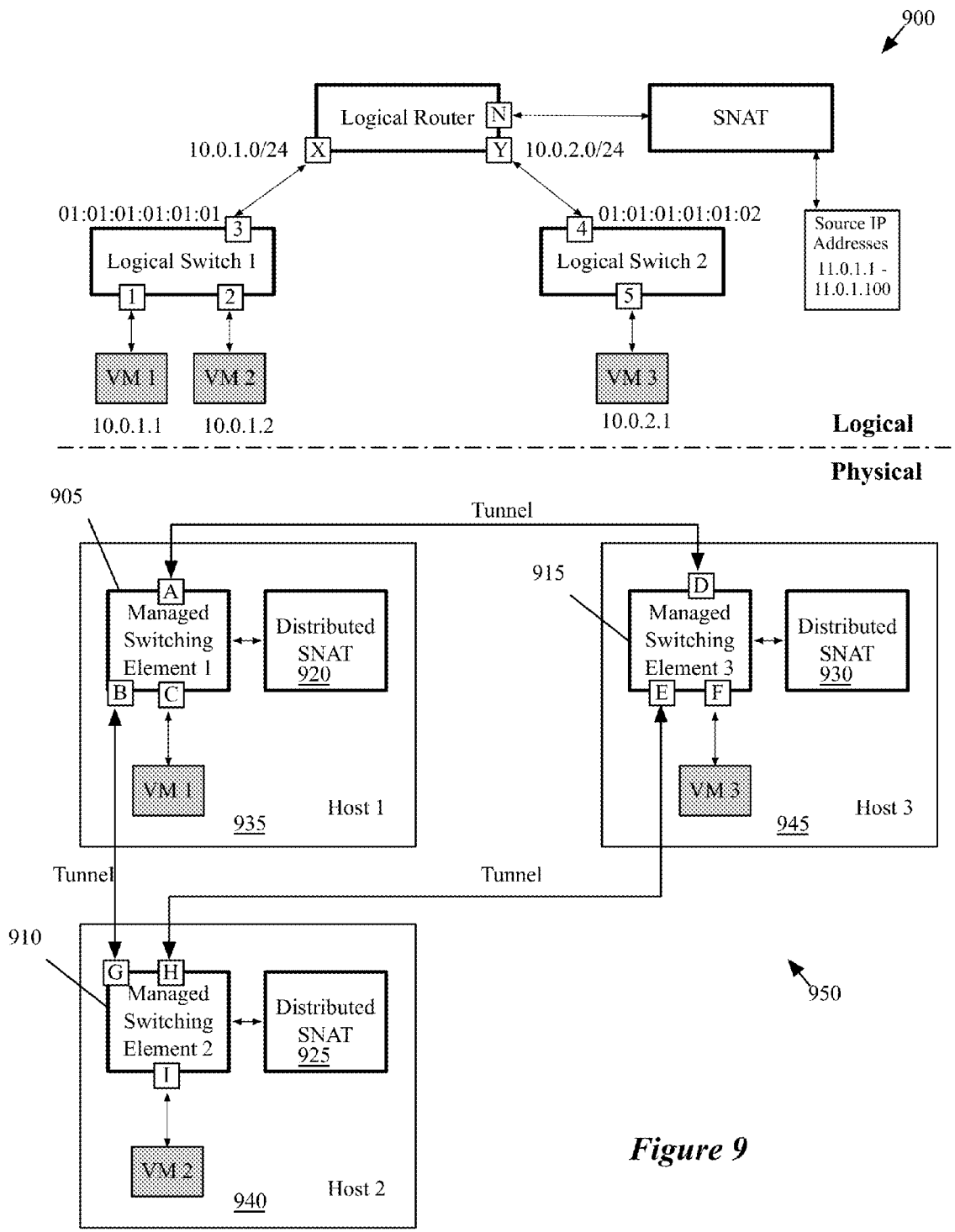
FIG. 9 conceptually illustrates a logical network and the physical network that implements this logical network.

FIGS. 9, 11, 12, and 14-17 illustrate example operations of three MSEs 905-915 and corresponding distributed SNAT elements 920-930 that implement a logical network 900. These example operations include the use of both reverse hint and conflict resolution flow entries in such a system. FIG. 9 conceptually illustrates the logical network 900 and the physical network 950 that implements this logical network 900. Specifically, this figure shows a logical network similar to that of FIG. 1, with the middlebox having a specific SNAT functionality. In addition, the logical network illustrates logical port numbers as well as MAC and IP addresses of some of those ports. The description of these ports will be used in the description of the subsequent FIGS. 10-16. While this example illustrates conflict resolution in the case of distributed SNAT, one of ordinary skill in the art will recognize that the concepts can apply in logical networks that do not use SNAT, but may also result in conflicts (e.g., as the result of other types of middleboxes). Furthermore, logical networks may include SNAT and perform conflict resolution as described here even for connections that do not utilize the SNAT processing.

As shown, the logical switch 1 has three ports numbered 1-3. Port 1 is associated with VM 1's L2 address (e.g., a MAC address), and Port 2 is associated with VM 2's L2 address. Port 3 is associated with the MAC address of port X of the logical router. The logical switch 2 has two ports 4-5. Port 4 is associated with the MAC address of port Y of the logical router. In this example, the MAC address of port X is 01:01:01:01:01:01 and the MAC address of port Y is 01:01:01:01:01:02.

The logical router has ports X, Y, and N. Port X is coupled to port 3 of the logical switch 1. In this example, the logical switch 1 forwards packets between VMs that have IP addresses that belong to a subnet IP address of 10.0.1.0/24. Port X is therefore associated with a subnet IP address of 10.0.1.0/24. Port Y is coupled to port 4 of the logical switch 2. In this example, the logical switch 2 forwards packets between VMs that have IP addresses that belong to a subnet IP address of 10.0.2.0/24, and Port Y is therefore associated with a subnet IP address of 10.0.2.0/24. Port N is attached to the SNAT middlebox and is not associated with any IP subnet in this example. In some embodiments, the MFE uses a software abstraction port that does not map to a corresponding physical port (e.g., a VIF) in order to communicate with the distributed middlebox instance. In addition, the figure illustrates that VM 1 has an IP address of 10.0.1.1, VM 2 has an IP address of 10.0.1.2, and VM 3 has an IP address of 10.0.2.1 in this example. The logical SNAT in this example has a set of IP addresses 11.0.1.1-11.0.1.100 into which it translates source IP addresses of packets that originate from the logical switch 1 (e.g., packets having real source IP addresses that belong to the subnet IP address of 10.0.1.0/24).

The bottom half of FIG. 9 illustrates the physical network 950 that implements this logical network 900. This network includes three hosts 935-945 on which the MFEs 905-915 and distributed SNAT elements 920-930 run, respectively.

The first MFE 905 has ports A-C, the second MFE 910 has ports G-I, and the third MFE 915 has ports D-F. In this example, the tunnel established between the MFEs 905 and 910 terminates at ports B and G, the tunnel established between the MFEs 905 and 915 terminates at ports A and D, and the tunnel established between the MFEs 910 and 915 terminates at ports H and E. Port C of the first MFE 905 maps to port 1 of the logical switch 1, and therefore port C is associated with the MAC address of VM 1. Port I of the second MFE 910 maps to port 2 of the logical switch 1 and therefore port I is associated with the MAC address of VM 2. Port F of the third MFE 915 maps to port 5 of the logical switch 2 and therefore port F is associated with the MAC address of VM 3.

The following series of figures illustrates processes performed by the distributed SNAT elements 920-935 in some embodiments to process packets sent between the VMs on the first logical switch and VM 3 on the second logical switch. While these examples illustrate various operations (e.g., installing conflict resolution flow entries) as performed by the distributed SNAT elements, one of ordinary skill in the art will recognize that in some embodiments these operations may be performed by the MFEs themselves.

A. First-Hop Processing of Initial Packet

Figure 10:
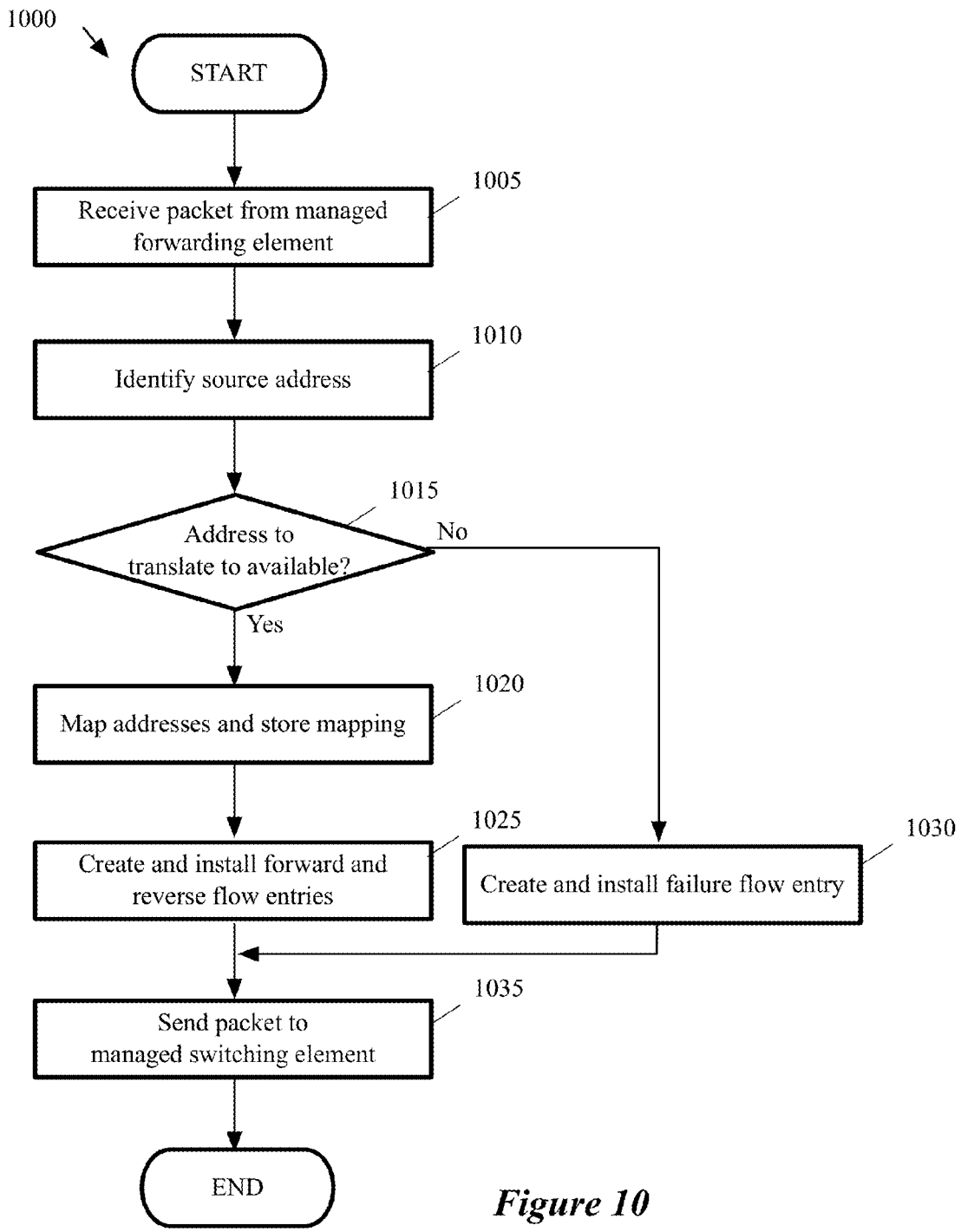
FIG. 10 conceptually illustrates a process performed by a distributed SNAT middlebox element of some embodiments in order to translate source network addresses of the packets received from the MFE that operates in the same host as the distributed SNAT element.

FIG. 10 conceptually illustrates a process 1000 performed by a distributed SNAT middlebox element of some embodiments. In some embodiments, the process 1000 is performed by the distributed middlebox instance in order to translate source network addresses of the packets received from the MFE that operates in the same host as the distributed SNAT element. In some embodiments, the distributed SNAT element uses flow templates to generate new flow entries and install these in the forwarding tables of the MFE. These flow templates are flow entries with certain values (e.g., values that are matched over, or values used in the actions specified by the flow entry). In some such embodiments, the SNAT element generates new flow entries by filling in the flow templates with the actual values for installation in the flow tables of the local MFE.

As shown, the process 1000 begins by receiving (at 1005) a packet from the local MFE running on the same host, which is the first-hop MFE for the received packet. That is, the MFE sending the packet to the SNAT element would have received the packet from a source VM with which the MFE directly interfaces. The destination IP address of the received packet is that of a destination VM coupled to a different logical switch than the source VM for the packet.

Next, the process 1000 identifies (at 1010) the source IP address of the received packet so that the process can translate this address into another IP address. This source address is generally that of the VM that initially sent the packet, which resides in the same host as the MFE and the SNAT element.

The process 1000 then determines (at 1015) whether an IP address to which to translate the source address of the packet is available. In some embodiments, the distributed SNAT element maintains a set of IP addresses for the particular IP subnet of the logical switch from which the packet originated.

When all IP addresses in the maintained set are in use, the process 1000 determines that no address is available, and creates (at 1030) a failure flow entry for installation at the MFE. In some embodiments, the failure flow entry is created by the SNAT element by filling in a flow template for dropping a packet with the relevant information about the packet (e.g., source IP address, destination IP address, etc.). In some embodiments, the MFE installs the flow entry in its forwarding tables, and in other embodiments the SNAT element is responsible for this installation.

On the other hand, when at least one address is available in the set of IP addresses for the subnet, the process maps (at 1020) the source IP address of the packet to a selected one of the available IP addresses, and stores this mapping (e.g., in a connection table). In some embodiments, this involves modifying the source IP of the current packet to be the selected new IP address in addition to storing the mapping of addresses. Furthermore, as indicated above, some embodiments additionally modify the source transport port number for the packet, and store this mapping as well.

In addition, the process creates (at 1020) both forward and reverse SNAT flow entries for installation at the MFE. The forward flow entry, in some embodiments, directs the first-hop MFE to modify a matched packet by replacing the source IP address of the packet with the IP address to which the source IP address is mapped. In this case, the forward flow entry maps the source IP address of the received packet to the address selected from the pool of available addresses. The reverse flow entry, in some embodiments, directs the MFE to modify a matched packet by replacing the destination address of the packet to the a real IP address to which the destination address maps. In this case, packets will match the flow entry when their destination address is the address selected from the pool by the SNAT element (along with other conditions for matching), and the flow entry specifies to modify this address to the real IP address of the VM that sent the packet currently processed by the SNAT element. As with the failure flow entry, some embodiments install the flow entries into the forwarding tables of the MFE, while in other embodiments the MFE receives the generated flow entries and installs the flow entries into its forwarding tables.

The process 1000 then sends (at 1035) the packet back to the local MFE, and ends. As mentioned, in some embodiments the SNAT element modifies the source address of this first packet so as to avoid the need for the MFE to do so. In other embodiments, the MFE performs the modification according to the newly installed flow entries. In addition, this process and the subsequent examples illustrate the SNAT element only processing the first packet, with subsequent packets processed by the dynamically generated flow entries of the MFE. Some embodiments, on the other hand, send all packets to the SNAT element, which uses the data stored in its connection table to modify the source address of all of the packets.

Figure 11:
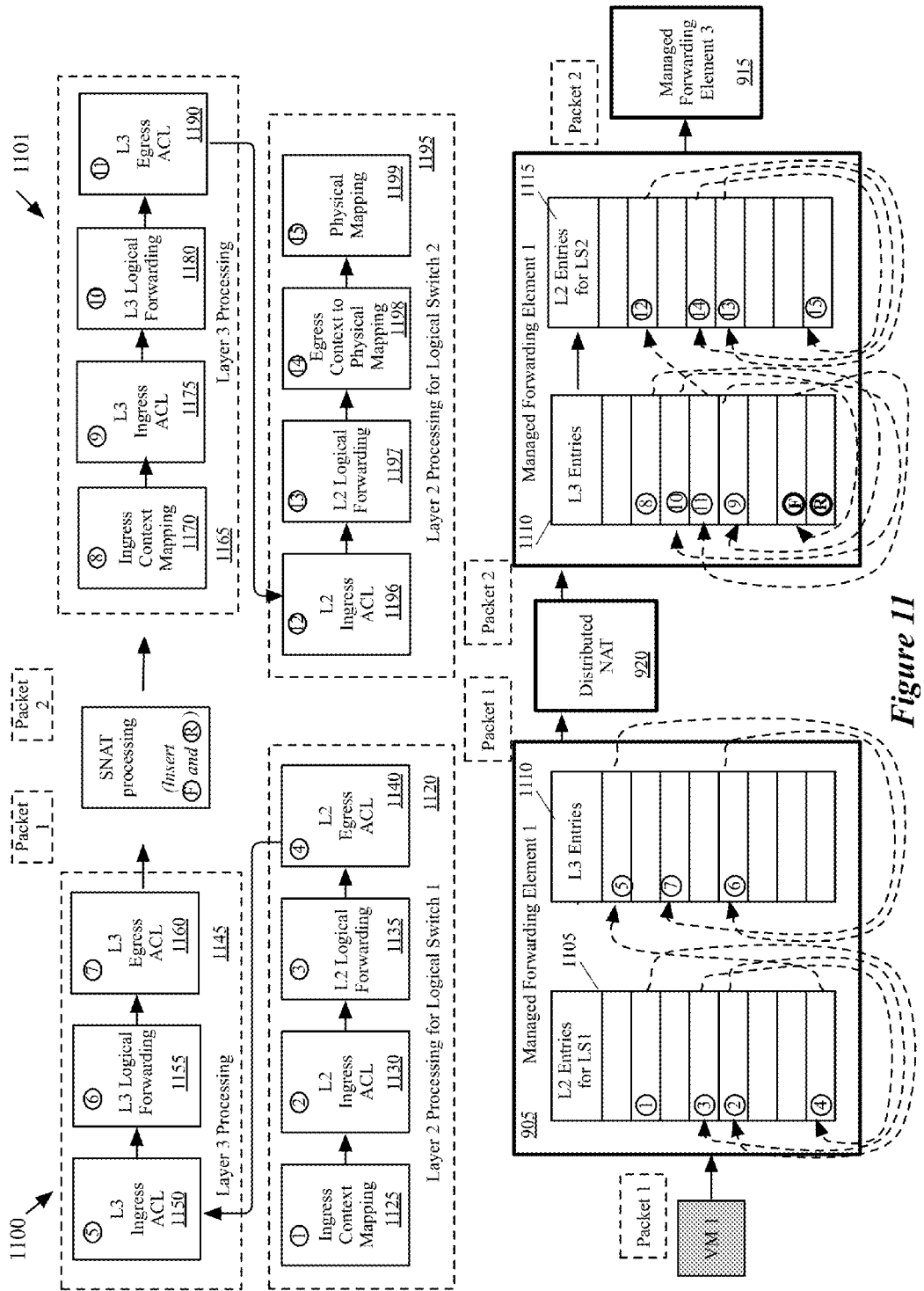
FIG. 11 conceptually illustrates an example operation of the first-hop MFE processing a packet sent from VM 1 to VM 3.

FIG. 11 conceptually illustrates an example operation of the first-hop MFE processing a packet sent from VM 1 to VM 3. The packet in this example is the first packet sent from VM 1 to VM 3, or at least the first packet for a new transport connection. This figure also illustrates the operation of the distributed SNAT element 920 that receives the packet from the first-hop MFE 905. The top half of FIG. 11 illustrates two processing pipelines 1100 and 1101 that are performed by the MFE 905. As shown, the processing pipeline 1100 includes L2 processing 1120 that implements the logical switch 1 and L3 processing 1145 that implements the logical router, which have stages 1125-1140 and stages 1150-1160, respectively. The second processing pipeline 1101 performed by the MFE 905 includes L3 processing 1165 for the logical router and L2 processing 1195 for the logical switch 2, which have stages 1170-1190 and stages 1196-1199, respectively.

The bottom half of the figure illustrates the MFEs 905 and 915, and VM 1. As shown, the first MFE 905 includes a forwarding table 1105 for storing flow entries for the logical switch 1, a table 1110 for storing flow entries for the logical router, and a table 1115 for storing flow entries for the logical switch 2. Although these tables are depicted as separate tables, other embodiments may store all of the flow entries in a single table, or divide the flow entries among tables differently.

When VM 1 (coupled to logical switch 1) sends an initial packet 1 to VM 3 (coupled to logical switch 2), the packet first arrives at the MFE 905 through its port C interface with VM 1. The MFE 905 performs L2 processing 1120 on packet 1 using the flow entries in its forwarding table 1105. In this example, packet 1 has a destination IP address of 10.0.2.1, which is the IP address of VM 3 as described above by reference to FIG. 9, and a source IP address of 10.0.1.1. The packet also has VM 1's MAC address as a source MAC address and the MAC address of port X (01:01:01:01:01:01) of the logical router as its destination MAC address.

The MFE 905 identifies a flow entry indicated by an encircled 1 (referred to as "record 1") in the forwarding table 1105 that implements the ingress mapping of stage 1125. The record 1 identifies packet 1's logical context based on the ingress port. Specifically, in some embodiments, this flow entry maps port C of the MFE, through which packet 1 is received from VM 1, to the logical port 1 of logical switch 1. In some embodiments, the record 1 specifies that this logical context information (the logical ingress port and logical switch) be stored in registers (e.g., memory constructs) for the packet. The record 1 additionally specifies that the packet be sent to a dispatch port of the MFE for further processing by the forwarding tables. A dispatch port, in some embodiments, is a port of a forwarding element that resubmits the packet to the forwarding element.

Based on the stored logical context information (i.e., the logical ingress port and logical switch), and/or information stored in packet 1's header (e.g., the source and/or destination addresses), the MFE 905 identifies a flow entry indicated by an encircled 2 (referred to as "record 2") in the forwarding tables that implements the ingress ACL of the stage 1130. ACL entries may drop packets, allow packets for further processing, etc. (e.g., based on the ingress port and/or other information). In this example, the record 2 allows further processing of packet 1, and therefore specifies that the MFE resubmit the packet through the dispatch port.

Next, the MFE 905 identifies, based on the stored logical context and/or information stored in packet 1's header, a flow entry indicated by an encircled 3 (referred to as "record 3") in the forwarding tables that implements the logical L2 forwarding of the stage 1135. The record 3 specifies that a packet with a destination MAC address of port X of the logical router is logically forwarded to port 3 of the logical switch 1. This logical egress port information is stored in the registers for the packet and/or the header of the packet itself. In addition, the record specifies that the MFE resubmit the packet through the dispatch port.

Next, the MFE 905 identifies, based on the logical context and/or information stored in packet 1's header, a flow entry indicated by an encircled 4 (referred to as "record 4") in the forwarding table 1105 that implements the egress ACL of the stage 1140. In this example, the record 4 allows further processing of packet 1 (i.e., that the packet is allowed to exit port 3 of the logical switch, and thus specifies that the MFE resubmit the packet through the dispatch port.

At this point, the logical context information stored in the registers specifies that the packet has entered the logical router through its port X. The MFE 905 thus next identifies, based on this logical context and/or information stored in packet 1's header, the flow entry indicated by an encircled 5 (referred to as "record 5") in the forwarding table 1110 that implements L3 ingress ACL for the logical router. This record 5 specifies that the MFE 905 allow the packet through port X of the logical router (e.g., based on an allowable source IP address for that port). As the packet is allowed, the record 5 also specifies that the MFE resubmit the packet through the dispatch port.

The MFE 905 then identifies a flow entry indicated by an encircled 6 (referred to as "record 6") in the forwarding table 1110 that implements the L3 forwarding 1155. This flow entry specifies that the MFE send the packet to the distributed SNAT element 920 through logical port N. That is, the record 6 specifies that the MFE send any packet having a source IP address that belongs to the subnet 10.0.1.0/24 to the SNAT element 920. Because packet 1 has the source IP address 10.0.1.1, which belongs to this subnet, the logical L3 forwarding decision sends the packet to the distributed SNAT element.

Next, the MFE 905 identifies a flow entry indicated by an encircled 7 (referred to as "record 7") in the forwarding table 1110 that implements L3 egress ACL 1160 for the logical router. This record 7 specifies that the MFE 905 allow the packet to exit out through port N of the logical router (e.g., based on the destination IP address or other information from the packet header and/or registers). With the packet allowed, the MFE sends packet 1 to the distributed middlebox instance 920. In some embodiments, the MFE (e.g., according to a flow entry not shown in this figure) attaches a slice identifier to the packet before sending it to the SNAT element, so that the SNAT element knows which of its potentially several instances should process the packet.

Upon receiving packet 1, the SNAT element 920 identifies an IP address to which to translate the source IP address (10.0.1.1) of packet 1. In this example, the distributed middlebox instance 125 selects 11.0.1.1 from the range of IP addresses (11.0.1.1-11.0.1.100) described above by reference to FIG. 9. The distributed SNAT element 920 modifies the source IP address of the current packet 1 to have the selected IP address 11.0.1.1. In addition, the distributed SNAT element 920 creates (i) a forward flow entry that specifies that the MFE 905 modify packets with a source IP address of 10.0.1.1 by replacing the source IP address (10.0.1.1) with the selected IP address (11.0.1.1) and (ii) a reverse flow entry that specifies that the MFE modify packets with a destination IP address of 11.0.1.1 by replacing the destination IP address (11.0.1.1) with the IP address of VM 1 (10.0.1.1). The reverse flow entry ensures that a response packet from VM 3 reaches the correct destination. In some embodiments, the SNAT element 920 installs the dynamically created flow entries in the forwarding tables of the MFE 905, while in other embodiments the SNAT element sends these flow entries to the MFE for installation in the forwarding tables. The SNAT element then sends back a new packet 2 to the MFE. At this point, the forward and reverse SNAT flow entries are installed in the table 1110, as indicated by the encircled F and R.

In some embodiments, the SNAT element 920 uses flow templates to generate the forward and reverse SNAT flow entries. These flow templates, in some embodiments, are stored by the distributed SNAT element for use in generating flows for incoming packets. In still other, flow templates are not used and the middlebox performs all SNAT processing.

In fact, a variety of techniques may be used to perform the SNAT processing in different embodiments. As shown in this figure and the subsequent FIG. 12, some embodiments send the first packet for a connection to an SNAT element, which modifies the packet to change the source address (and, in some embodiments, the source transport port number), and generates flow entries for processing future packets in both directions. On the other hand, the SNAT elements of some embodiments do not generate new flow entries, and instead all packets in both directions are sent to the SNAT element for processing. In still other embodiments, the distributed SNAT is not implemented as a module separate from the MFE, but instead as flow entries within the MFE. These flow entries perform the function of the described SNAT element, generating flow entries for future use that store the connection mapping information (i.e., to change the IP addresses).

Upon receiving packet 2, the MFE 905 treats this as a new packet received through its port with SNAT element 920. As this software port abstraction maps to the logical port N of the logical router, the MFE 905 performs the L3 processing 1165 on packet 2 based on the forwarding table 1110. The MFE 905 identifies a flow entry indicated by an encircled 8 (referred to as "record 8") in the forwarding table 810 that implements this ingress context mapping 1170, which maps the port through which the packet is received to logical port N of the logical router. The record 8 specifies to store this information in a set of registers for the packet, and resubmit the packet through the dispatch port. The next flow entry matched implements L3 ingress ACL 1175, similar to the ACL entries described above, and again resubmits the packet.

The MFE 905 then identifies a flow entry indicated by an encircled 10 (referred to as "record 10") in the forwarding table 1110 that implements L3 forwarding 1180. This record 10 specifies that packets with a destination IP address of 10.0.2.1 will be sent out of port Y of the logical router. Because the source address of the packet has been modified by the SNAT element 920, the record 6 that sent the packet to the SNAT element is not matched for packet 2 in some embodiments. In some embodiments, this logical forwarding decision is stored in either the packet header or the packet registers. In addition, the MFE resubmits the packet through its dispatch port. Next, the MFE 905 identifies the record 11 in the L3 entries 1110, and performs the L3 egress ACL 1190, which allows the packet out of the logical switch in this case.

In addition, one of the flow entries that implements L3 processing 1165, or another entry not shown in this figure, specifies that the MFE 905 rewrite the source MAC address for packet 2 from the MAC address of VM 1 to the MAC address of port Y of the logical router (01:01:01:01:01:02). Furthermore, the MFE may use the address resolution protocol (ARP) to resolve the destination IP address of the packet into the MAC address of VM 3, and replace the current destination MAC address of the packet (that of port X of the logical router) with this identified MAC address for the eventual destination VM.

The packet registers at this point specify that packet 2 has entered the logical switch 2 through port 4, at which point the MFE 905 performs L2 processing 1195. This first includes L2 ingress ACL 1196, performed according to record 12 from the forwarding table 1115. Next, the MFE identifies record 13, which implements logical L2 forwarding 1197. This record 13 specifies that the MFE forward the packet to logical port 5 (e.g., based on the destination MAC address of the packet which maps to this logical port. In some embodiments, this logical forwarding decision is stored in the packet header and/or the packet registers. The record 13 also specifies to resubmit the packet through the MFE's dispatch port.

The records 14 and 15 are next identified, in sequence, in order to send the packet over the tunnel to MFE 915. The first record 14 implements the egress context mapping, which maps the logical output port of the logical switch (port 5) to a physical destination of the third MFE 915, and the record 15 implements the physical mapping, which maps this destination to the physical port A of the MFE 905 and encapsulates the packet with a tunnel header. Rather than resubmit the packet through the dispatch port, the MFE sends the packet out over the tunnel.

B. First-Hop Processing of Subsequent Forward Packets

The above figure illustrates the first-hop processing of an initial packet sent between two VMs (specifically, from VM 1 to VM 3 in the example of FIG. 9). In this example, subsequent packets sent in the same direction (for the same transport connection) will be processed in a more efficient manner, as the packet need not be sent from the MFE to the distributed SNAT element at the first hop. In some embodiments, the flow entries have different priority levels. Some embodiments check the higher-priority flow entries first, so that these are matched and acted upon prior to matching the lower-priority flow entries. Thus, instead of matching the flow entry that sends packets with a particular source IP address to the distributed SNAT element, the packet matches the forward SNAT flow entry in the MFE, which has a higher priority than the flow entry that sends the packet to the SNAT element. The action specified by this flow entry causes the MFE to change the source IP address of the packet prior to sending the packet out over a tunnel to its destination.

Figure 12:
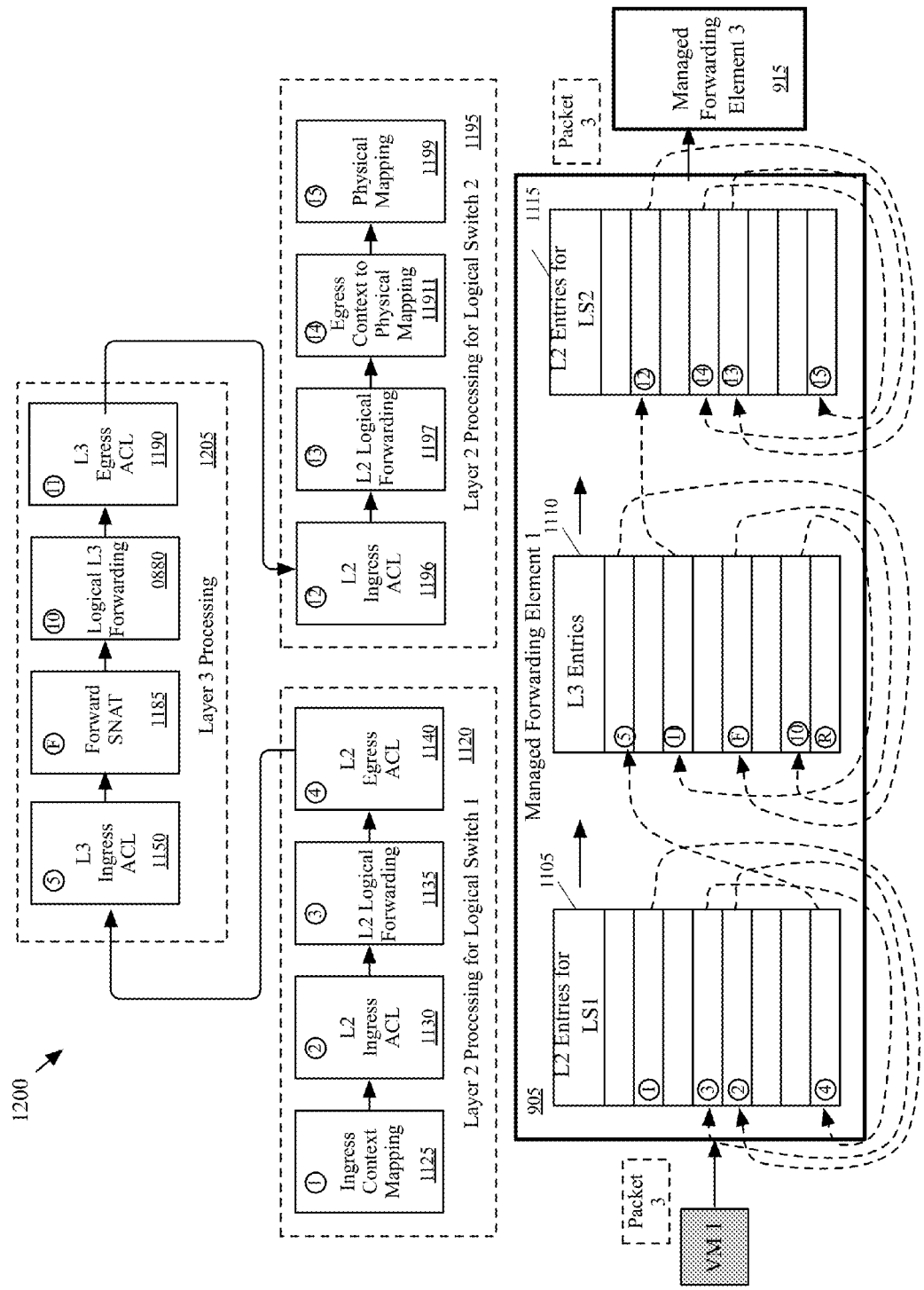
FIG. 12 conceptually illustrates an example operation of the first-hop MFE processing a subsequent packet sent from VM 1 to VM 3.

FIG. 12 conceptually illustrates an example operation of the first-hop MFE 905 processing a subsequent packet sent from VM 1 to VM 3. At this point, the forward and reverse SNAT flow entries for this transport connection have been generated by the SNAT element 920 and installed in the forwarding tables of the MFE 905. The packet sent by VM 1 has the same source and destination addresses (both MAC and IP) as the initial packet sent for the transport connection. As with FIG. 11, the top half of the figure illustrates a processing pipeline 1200 performed on the packet, which includes the L2 processing 1120 that implements the logical switch 1, L3 processing 1205 that implements the logical router, and L2 processing 1195 that implements the logical switch 2.

As compared to the processing of the previous FIG. 11, the logical switch processing 1120 is the same in FIG. 12, and sends the packet to the logical router. However, the logical router pipeline 1205 does not send the packet to the distributed SNAT element 920. Instead, the packet first matches the high-priority forward SNAT flow entry, which causes the MFE to modify the source IP address of the packet from 10.0.1.1 to 11.0.1.1. Once this is changed, the packet will not match the flow entry that routes the packet to the distributed SNAT element, and therefore instead matches the flow entry to route the packet to the logical port Y (logical switch 2). This implementation of SNAT within the L3 pipeline only occurs in the specific situation in which either (i) the SNAT element has the capability to generate and install flow entries into the MFE forwarding tables (as shown in FIG. 11) or (ii) the SNAT is implemented via forwarding tables within the L3 pipeline in the first place. In other embodiments, subsequent packets are also sent to the distributed SNAT element 920 via a logical router port and then received back through that logical router port as a new packet. After this, the MFE proceeds as for the initial packet, performing the processing pipeline of logical switch 2 and sending the packet out over the tunnel.

C. Last-Hop Processing of the First and Subsequent Packets

The above discussion describes the first-hop processing of forward direction packets sent between VMs, for both the first and subsequent packets. In addition, the packets arrive at a last-hop MFE that delivers the packet to its destination VM, and which performs additional logical processing. In some embodiments, that additional logical processing includes identifying any conflicting addresses as a result of network address translation, and dynamically generating flow entries to resolve such conflicts.

These conflicts may arise due to the first-hop MFEs and the middlebox (e.g., SNAT) elements not sharing state between each other. Because these elements do not share state across hosts, two SNAT elements performing the process of FIG. 10 (e.g., as shown in FIG. 11) may select the same source address and/or same source transport port number. If these MFEs select this source address and source transport port number for two source VMs that are sending packets to different destination VMs, no problem arises. However, if the two source VMs are assigned the same address and/or port number for connections to the same destination VM, then a conflict will arise at the destination VM. In some embodiments, the VMs run a standard TCP/IP stack which always assumes that the 5-tuple of {source IP, destination IP, transport protocol type, source transport port number, destination transport port number} is unique. Accordingly, if the source IP and source port for two connections are the same, the destination VM will treat these as the same connection. Furthermore, when the MFE receives return packets from this destination VM, the MFE will not be able to differentiate the connections to determine to which MFE to send the packet. In order to resolve this conflict, some embodiments modify one of the values that makes up the 5-tuple (e.g., the source port number or source IP address) before sending the packets to the destination VM.

Figure 13:
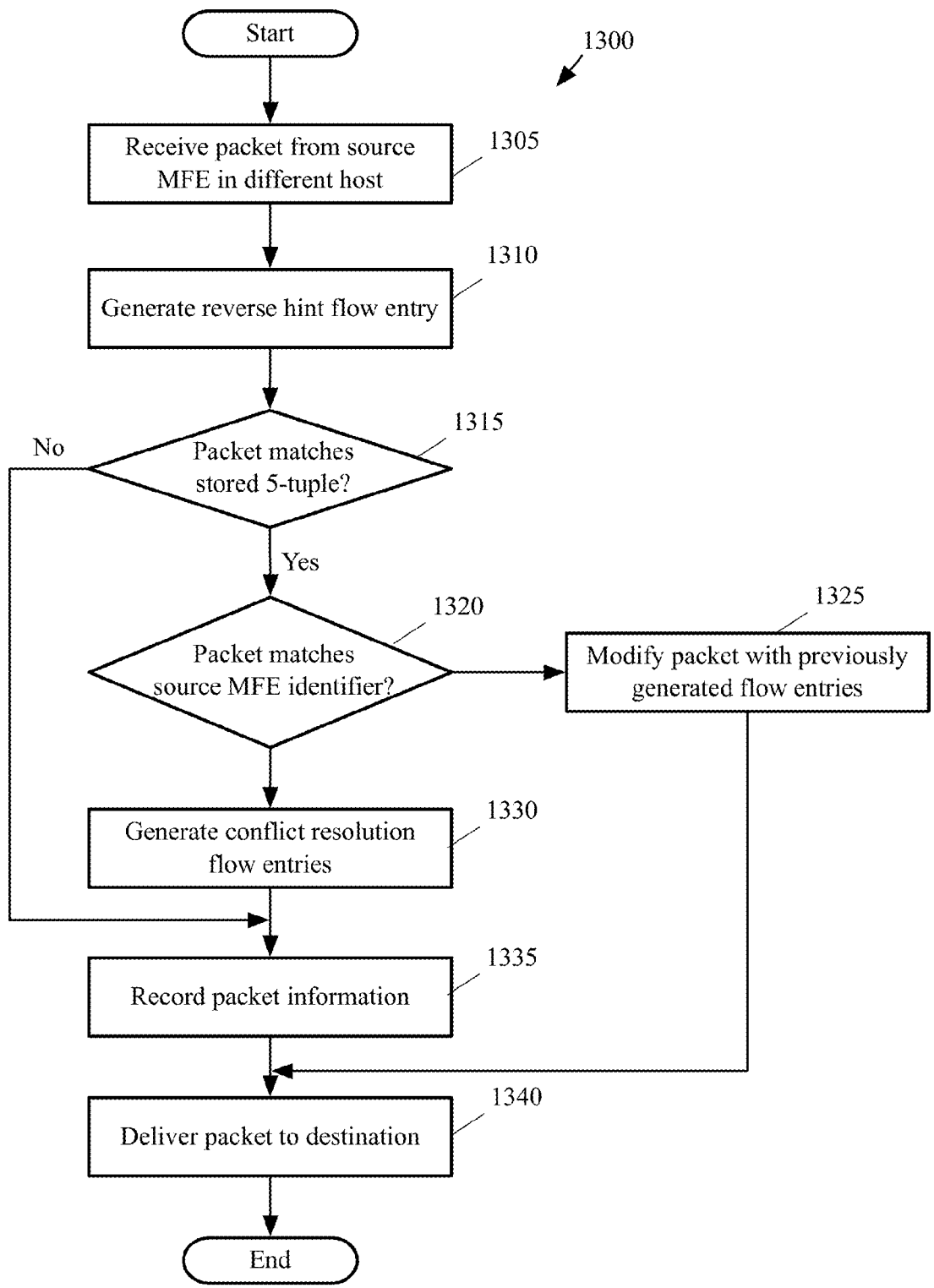
FIG. 13 conceptually illustrates a process performed by some embodiments to dynamically generate flow entries for performing conflict resolution at a last-hop MFE when receiving a forward-direction packet for a transport connection.

FIG. 13 conceptually illustrates a process 1300 performed by some embodiments to dynamically generate flow entries for performing conflict resolution at a last-hop MFE when receiving a forward-direction packet for a transport connection. The last-hop MFE for a particular packet is the last MFE that processes a packet before the packet arrives at its destination. In the case of VM to VM traffic, the last-hop MFE directly interfaces (e.g., through a virtual interface) with the destination VM. For example, in the previous example shown in FIG. 11, the MFE 915 is the last hop. As described in the previous section, the last-hop MFE of some embodiments generates a reverse hint flow entry for each transport connection. Similarly, the last-hop MFE generates conflict resolution flow entries to use in processing future packets as well.

As shown, the process 1300 begins by receiving (at 1305) a packet from another MFE in a different host. In some embodiments, this packet is received through a tunnel between the last-hop MFE and the other MFE (e.g., the first-hop MFE for the packet). Between these MFEs may be additional unmanaged forwarding elements through which the packet tunnels. In addition, this packet will have logical context information that indicates that the packet has traversed the logical network and a logical egress port has been identified (i.e., the egress port corresponding to a VM that connects to the last-hop MFE).

The process 1300, in some embodiments, generates (at 1310) a reverse hint flow entry. As described in the previous section, the reverse hint flow entry of some embodiments sends a reverse direction packet back to the forward-direction first-hop MFE before performing logical processing on the packet. In some embodiments, the reverse hint flow entry is generated by the same element that generates the conflict resolution entries (e.g., the MFE). In some embodiments, as described above, the reverse hint flow entry matches packets based on the connection 5-tuple. However, as noted, there may be multiple connections with the same 5-tuple, differentiated only by source MFE. Accordingly, some embodiments use an identifier for this source MFE as a sixth matching parameter when generating the reverse hint flow entry. As described below, when reverse conflict resolution is performed, the flow entry for that reverse packet modification also specifies to restore this source MFE identifier and write the source MFE identifier into a register, allowing for the reverse hint entry to be matched based on both the connection 5-tuple and this source MFE parameter stored in the register. Thus, two connections coming from two different source MFEs will not cause the MFE to generate two identical reverse hint flow entries.

Next, the process 1300 determines (at 1315) whether a packet with the same characteristics (e.g., the same 5-tuple) has previously been received. In some embodiments, the MFE maintains a table of connection 5-tuples and corresponding source MFE or tunnel identifiers. Upon receiving a new packet, the MFE checks the table to determine whether the new packet's 5-tuple matches one of the 5-tuples already stored in the table. If the 5-tuple does not yet exist, the process proceeds to operation 1335 to record the packet information in the table, as described below.

If the 5-tuples match, the MFE performing the process also checks (at 1320) the source MFE identifier to determine whether the packet is traffic for an existing connection. In some embodiments, the MFE stores a time to live with each table record, so that records are removed occasionally (i.e., as the underlying transport connections are no longer ongoing). One of ordinary skill in the art will recognize that the process 1300 is a conceptual process. For example, in some embodiments, the process 1300 is performed through the matching of flow entries in the MFE's forwarding tables. When the packet is part of a previously-seen connection from a particular MFE, the MFE matches the packet (using the connection 5-tuple and the source MFE identifier) to a particular high-priority flow entry that exists for the connection and performs the conflict resolution.

As such, when the packet matches the 5-tuple and the source identifier, the process modifies (at 1325) the packet using previously generated conflict resolution flow entries, if needed, and then proceeds to operation 1340. Some embodiments skip this operation for existing connections that do not require modification, or use a flow entry that amounts to a no-op as a way to record the connection's existence. As indicated, some embodiments modify the packet by changing the source IP address or source transport port number, so that the destination VM will be able to differentiate between two or more otherwise conflicting connections. In some embodiments, the TCP/IP stack at the receiving VM treats the source port number as not meaningful for anything other than connection identification.

When the set of characteristics (e.g., the 5-tuple) matches one of the stored entries (but not the source MFE identifier), the process generates (at 1330) conflict resolution flow entries. In some embodiments, the conflict resolution flow entries include both forward and reverse direction entries. The forward direction conflict resolution entry, which is matched by packets for which the local MFE is the last hop, directs the MFE to modify the packet in such a way as to distinguish the packet from other packets received with the same characteristics (e.g., 5-tuple). In some embodiments, the forward direction flow entry modifies at least one of the members of the 5-tuple identifier, such as the source port number or source IP address.

The reverse direction conflict resolution flow entry essentially undoes the action of the forward direction entry for packets received from the destination VM of the current packet, prior to applying a reverse hint flow entry and sending the packet to the current first-hop MFE (the last-hop MFE for the packets to which the flow entries are applied). For instance, if the forward direction conflict resolution entry changes the source port number from value A to value B, then the reverse direction conflict resolution entry changes the destination port number from value B to value A. In addition, when the MFE generates the reverse direction conflict resolution flow entry, the MFE stores in this flow entry the source MFE identifier that identifies the MFE from which the current packet was received (e.g., using a tunnel identifier or other value). When the reverse direction conflict resolution flow entry is matched, it restores this source MFE identifier value into a register for the return packet, which allows further processing of the return packet to differentiate between connections (e.g., for the reverse hint flow entries to match over the 6-tuple of transport connection 5-tuple plus source MFE identifier).

After generating the conflict resolution flow entries, if necessary, the process records (at 1335) the packet information in its connection table, including both the 5-tuple and the first-hop MFE for the packet. This enables the middlebox element (or MFE) to identify future packets that may conflict with the presently processed packet. In addition, the process records any conflict resolution information. If the conflict resolution modifies the source port number, then the middlebox element records the new source port number so that this port number will not be used for any future connections (until the current one expires).

Lastly, the process 1300 delivers (at 1340) the packet to its destination. In some embodiments, this involves mapping the logical egress port (used in the encapsulation of the packet as received by the MFE) to the physical interface (e.g., a VIF of a VM) and delivering the packet to that interface.

Figure 14:
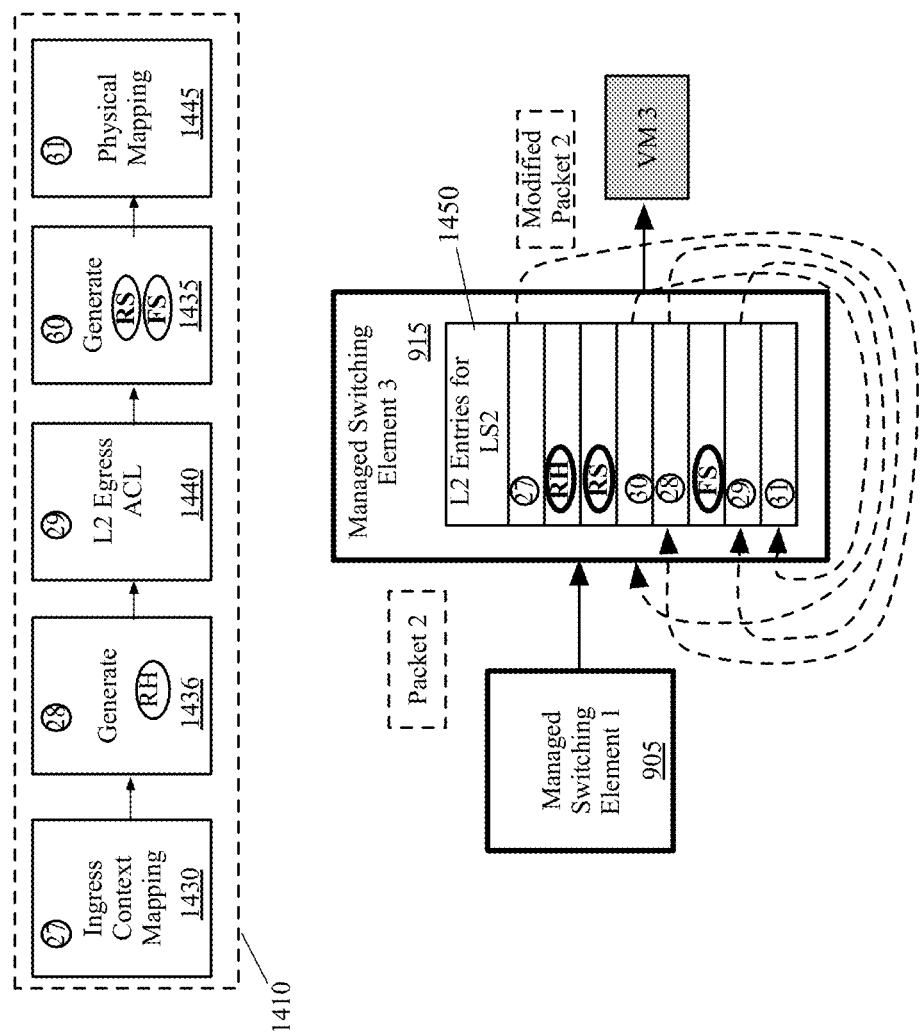
FIG. 14 conceptually illustrates an example operation of a last-hop MFE processing the packet sent from VM 1 to VM 3 in FIG. 11.

FIG. 14 conceptually illustrates an example operation of a last-hop MFE 915 processing the packet sent from VM 1 to VM 3 in FIG. 11. In that figure, the first-hop MFE 905 performed source NAT (based on flow entries generated by a distributed SNAT element) in order to modify the source IP address of a packet. In this case, the source IP address chosen by the distributed SNAT element 920 is the same IP address chosen previously by the distributed SNAT element 925 at the host 940 for an earlier packet sent from VM 2 to VM 3, and as such will cause a conflict at the last-hop MFE 915.

The top half of FIG. 14 illustrates a processing pipelines 1410 performed by the MFE 915. As shown, the processing pipeline 1410 includes the generation of both reverse hint and conflict resolution flow entries (also referred to as packet sanitization entries) as well as delivery of the packet to its destination.

The MFE 915 initially receives packet 2 from MFE 905 at its port D interface with the MFE 905. In some embodiments, the packet is actually received on the same physical interface as port E, but the MFE treats packets received from the different MFEs as having different physical ingress ports based on the tunnel encapsulation headers. The MFE 915 begins processing the packet using the flow entries in its forwarding table 1450. At this point, the packet 1 has a destination IP address of 10.0.2.1 (VM 3's IP address), and a source IP address of 11.0.1.1. The source MAC address is that of the logical router port Y (01:01:01:01:01:02), and the destination MAC is that of VM 3.

The packet arrives with a logical context appended to the packet (e.g., in the tunnel encapsulation, in a different portion of the packet header, etc.) that specifies that the packet has been logically forwarded to the port 5 of logical switch 2. The MFE 915 identifies a flow entry indicated by an encircled 27 (referred to as "record 27") in the forwarding table 1450 that implements the ingress mapping of stage 1420. The record 27 identifies the packet's logical context based on the physical ingress port (port D) as well as logical context specified on the packet. In some embodiments, the record 27 specifies that the logical context information be stored in registers for the packet. Additionally, the record specifies that the packet be sent to a dispatch port of the MFE for further processing by the forwarding tables.

The MFE 915 then identifies a flow entry indicated by an encircled 28 (referred to as "record 28"). This flow entry causes the MFE to generate a reverse hint flow entry for reverse direction packets, as described in the previous Section II. This reverse hint flow entry directs the MFE to send a matched packet through a tunnel to the MFE without performing logical processing on the packet. As shown, this reverse hint is installed in the forwarding table 1450 for use in future packet processing. In some embodiments, the reverse hint flow entry is matched based on the modified 5-tuple as well as a source MFE identifier, so that reverse direction packets are sent to the correct MFE (as VM 3 will send packets to both VM 1 and VM 2 using the same transport connection 5-tuple). As mentioned, the reverse sanitization flow entry (described below) directs the MFE 915 to store the source MFE identifier in a register for a reverse direction packet.

Next, the MFE 915 identifies a flow entry indicated by an encircled 29 (referred to as "record 29") in the forwarding tables that implements the L2 egress ACL 1440 for the logical switch 2. This record 29 specifies that the MFE 915 allow the packet to exit out of port 5 of the logical switch 2 (e.g., based on the destination MAC address or other information from the packet header and/or registers). In addition, the flow entry specifies to store context information in the registers and resubmit the packet through the dispatch port.

In some embodiments, each MFE stores a table or other data structure that lists all of the active transport level connections. Based on the incoming packet being the first packet in a connection that conflicts with another connection, the MFE 915 identifies a flow entry indicated by an encircled 30 (referred to as "record 30"). This flow entry specifies that the MFE dynamically generate conflict resolution flow entries based on the packet being the first in a new transport layer connection.

Specifically, the MFE 915 identifies that the 5-tuple of {source IP, source port, destination IP, destination port, transport protocol} for the received packet matches the stored info for a previously-sent packet sent from VM 2 to VM 3, because the SNAT elements 920 and 925 chose the same source IP address (and possibly source port number) from the available range of addresses (and port numbers). As the source MFE (i.e., tunnel through which the packet was received) is different, the record 30 specifies for the MFE to dynamically generate two flow entries (e.g., by filling in values of predefined flow templates).

The first flow entry identifies any packet received through the tunnel port D with a source IP address of 11.0.1.1, a destination IP address of 10.0.2.1, the matching source/destination ports (not referring to the logical or physical ports shown in FIG. 9, but rather the port numbers added by the transport layer to identify a service at each VM to send/receive the packet) and transport protocol (e.g., TCP, UDP, etc.). For packets matching these criteria, the generated conflict resolution (forward sanitization) flow entry modifies the source port number so as to differentiate the packet for the destination VM.

The second flow entry identifies any packet received from the port F interface with VM 3 (or at logical port 5) having a source IP address of 10.0.2.1, a destination IP address of 11.0.1.1, the same transport protocol, the source port number matching the destination port number of the current packet, and the destination port number matching the modified port number from the first flow entry. For packets matching these criteria, the generated conflict resolution (reverse sanitization) flow entry modifies the destination port number to match the correct value. In addition, in some embodiments, the generated reverse sanitization entry writes a source MFE identifier or other unique identifier for the connection to the register for the reverse direction packet. This unique identifier allows the MFE to differentiate between conflicting connections for the remainder of the processing (e.g., for matching the correct reverse hint flow entry).

Finally, after generating the sanitization entries and modifying the source port/address information, the MFE 915 identifies a flow entry indicated by an encircled 31 (referred to as "record 31") in the forwarding tables 1450 that implements the physical mapping of stage 1445. This record maps the logical egress port 5 to the physical port F (e.g., a virtual interface) of the MFE 915 to which VM 3 attaches. The MFE then sends the packet (as modified by the conflict resolution stage 1435) to the VM through this port. This record 31 would be matched prior to the packet being modified as well in some embodiments, but has a lower priority than record 30 and therefore is acted upon only after the MFE resubmits the packet, when no higher priority flow entries are matched.

The above describes the first packet for a transport connection to reach the last-hop MFE. For this first packet, the last-hop MFE generates the conflict resolution flow entries while modifying the packet. For subsequent packets, the MFE simply applies these previously-generated flow entries and delivers modified packets to the destination VM.

Figure 15:
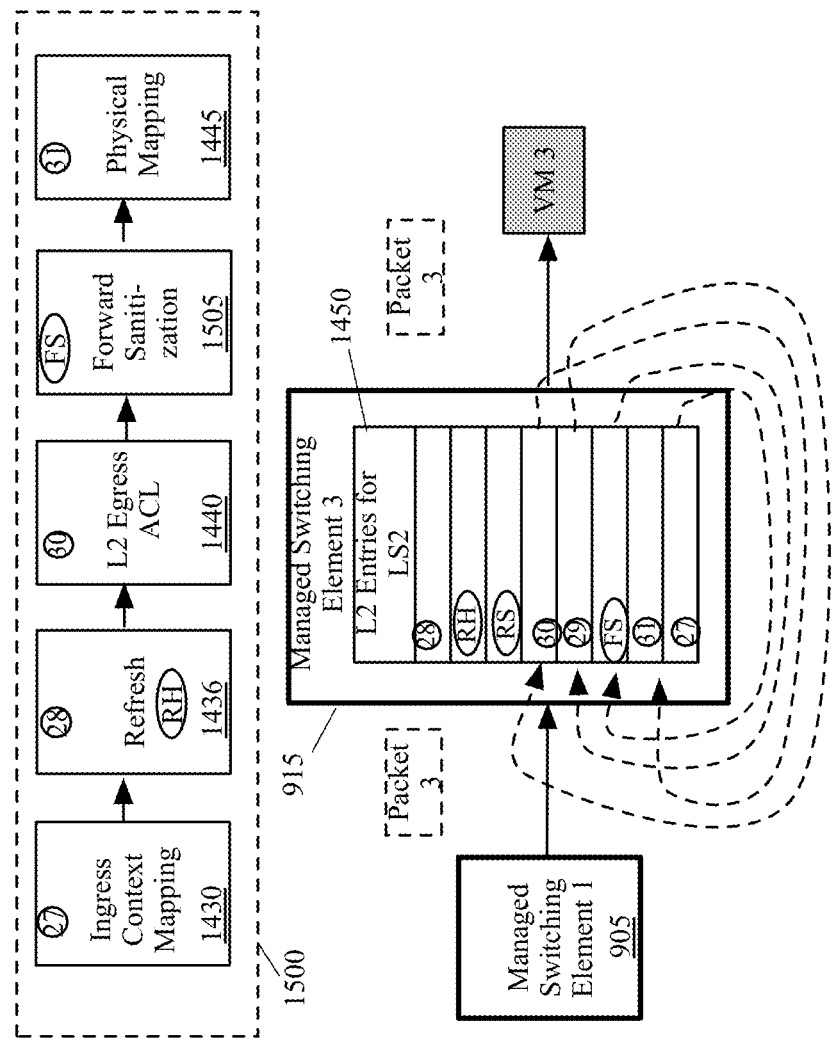
FIG. 15 conceptually illustrates an example operation of the last-hop MFE for subsequent packets sent from VM 1 to VM 3, such as the packet sent in FIG. 12.

FIG. 15 conceptually illustrates an example operation of the last-hop MFE 915 for subsequent packets sent from VM 1 to VM 3 (e.g., the packet sent in FIG. 12). These packets have the same properties as the packet from FIG. 14, the only difference being that the MFE 915 has already processed at least one packet having the properties.

The top half of FIG. 15 illustrates a processing pipeline 1500 performed by the MFE 915. The processing pipeline 1500 includes the stages 1430, 1436, 1440, and 1445, which are described above. Specifically, the MFE receives a packet via the same tunnel as the previous example, and with the same characteristics, and therefore matches the same ingress context mapping flow entry 27. In some embodiments, the packet again matches the reverse hint generation flow entry 28, which refreshes the reverse hint flow entry. The reverse hint flow entry has a timeout in some embodiments, and refreshing or regenerating the flow entry resets this timeout. In other embodiments, this record is only matched when a reverse hint for the packet's 5-tuple does not yet exist, and therefore for subsequent packets in a connection the stage is not performed. Next, the MFE performs L2 egress ACL to allow the packet out of its logical egress port. At this point, the packet matches the forward sanitization entry (FS) generated by record 30 in the processing pipeline 1410 of FIG. 14. This record FS specifies to modify the packet (e.g., the source transport port and/or IP address of the packet) as determined previously. The MFE then maps the logical egress port of the packet to its interface to the destination VM 3, and delivers the packet to the VM.

D. First-Hop Processing of Response Packets

The last-hop MFE for forward direction packets (e.g., from VM 1 to VM 3 in the present example) becomes the first-hop MFE for response packets (e.g., packets sent from VM 3 to VM 1). The above section II illustrated that the processing in the reverse direction is the opposite of that in the forward direction, in some embodiments. That is, each MFE performs the same operations, but they happen in the opposite order. In the examples of the previous section, the reverse hint causes the packet to be sent to the last-hop MFE for the bulk of the logical processing, and the packet traverses the logical network in the opposite direction via the flow entries at that last-hop MFE. In the case of reverse direction packets for a connection that has conflict resolution information introduced in the forward direction, the first-hop MFE modifies the packet to remove the conflict resolution information.

Figure 16:
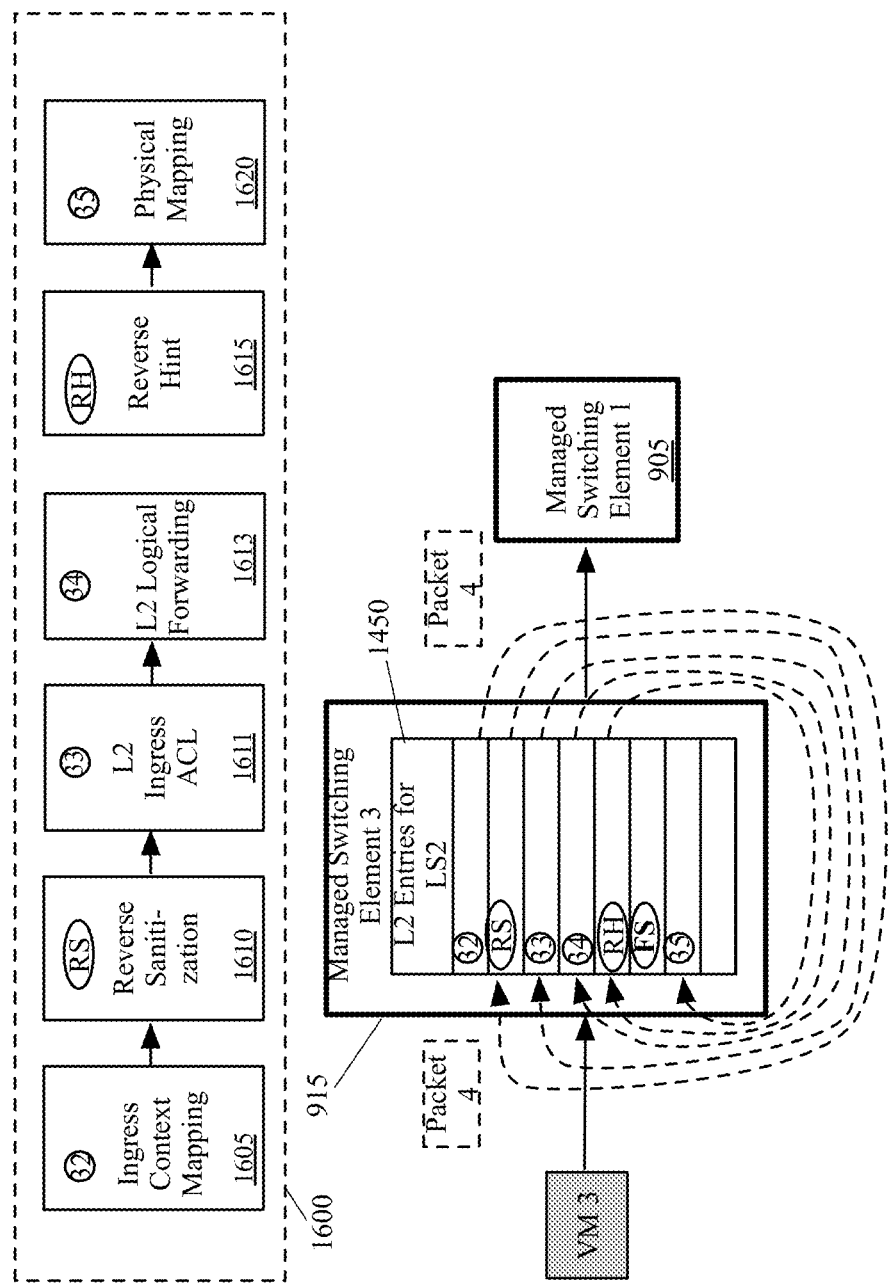
FIG. 16 conceptually illustrates an example operation of an MFE acting as a first-hop MFE with respect to a reverse direction packet sent from VM 3 to VM 1.

FIG. 16 conceptually illustrates an example operation of the MFE 915 acting as a first-hop MFE with respect to a reverse direction packet sent from VM 3 to VM 1. This packet might be sent as a response to the packet received from VM 3, shown in FIG. 11 and FIG. 14. The top half of FIG. 16 illustrates a processing pipeline 1600 performed by the MFE 915. As shown, the processing pipeline 1600 has four stages 1605-1620 that implement the reverse hint and the reverse of the conflict resolution packet modification. The MFE 915 initially receives the packet from VM 3 through physical port F. In this case, the source IP address of the packet is that of VM 3 (10.1.2.1) and the destination IP address is the translated IP for VM 1 (11.1.1.1). The destination port number used by the transport protocol for the packet is the modified source port number from the previous forward-direction packets, as VM 3 believes that is the correct port number to use.

Based on the physical ingress port F, the MFE 915 identifies a flow entry indicated by an encircled 32 (referred to as "record 32") in the forwarding tables 1450 that implements the ingress context mapping of the stage 1605. This flow entry maps the ingress physical port F to a logical ingress port 5 of the logical switch 2. In some embodiments, the MFE 915 stores the ingress port information in a register for the packet.

Based on the logical ingress port and the connection 5-tuple for the packet (which has the modified destination port and/or IP address), the MFE 915 identifies the reverse sanitization flow entry (the record RS) at stage 1610. The RS flow entry, generated as described above when processing a forward direction packet, modifies the current reverse direction packet to correct the destination port number and/or IP address. In addition, in some embodiments the RS flow entry maps the incoming 5-tuple (i.e., with the "sanitized" port number) to a source MFE identifier, used to identify the correct reverse hint, and writes this MFE identifier into a register. The RS flow entry then resubmits the packet through the dispatch port.

With the packet modified to have the correct 5-tuple for its connection, the process continues performing the ingress portion of the L2 pipeline. Specifically, the MFE identifies a L2 ingress ACL record 33 at stage 1611 that ensures that the packet should be allowed to enter through the logical ingress port identified by the record 32. The MFE next identifies a record 34 that performs logical L2 forwarding to identify a logical egress port of logical switch (i.e., logical port 4, attached to the logical router).

L2 ingress ACL (stage 1725) to ensure that the packet should be allowed to enter through this logical ingress port, L2 forwarding (stage 1730) to perform a logical forwarding decision based on the destination MAC address (01:01:01:01:01:02), and L2 egress ACL (stage 1735) to ensure that the packet should be allowed to exit the logical switch through the egress port determined at stage 1730. Based on the destination MAC address, the MFE logically forwards the packet to the logical router through logical port 4.

Next, rather than executing the logical router flow tables, the MFE identifies the reverse hint flow entry, the record RH at stage 1615. This reverse hint flow entry, as indicated above, matches on the connection 5-tuple (e.g., with the corrected destination port number) and the source MFE identifier written into the register according to the reverse conflict resolution flow entry RS. In addition, as for most of the flow entries described herein, the reverse hint flow entry also matches on the logical datapath (i.e., the logical switch 2, in this case, which in some embodiments is identified and stored in the registers upon determination of the logical ingress port). When matched, the record RH specifies for the MFE 915 to send the packet through the tunnel to MFE 905 rather than continuing to perform logical processing, information which it stores in the register. The record also specifies to resubmit the packet to the dispatch port.

Lastly, the MFE 915 identifies a flow entry indicated by an encircled 33 (referred to as "record 33") that implements the physical mapping stage 1620. Specifically, this record encapsulates the packet in a tunnel header that, in some embodiments, indicates the logical ingress port information and sends the packet out through the correct physical port to the MFE 905. In some embodiments, this stage is implemented by multiple flow entries.

E. Last-Hop Processing of Response Packets

Just as the last-hop MFE for forward direction (connection initiation direction) packets becomes the first-hop MFE for reverse direction packets, the first-hop MFE for the forward direction packets becomes the last-hop MFE for reverse direction packets. In logical networks that use a reverse hint to send reverse direction packets to the last-hop MFE, the bulk of the logical processing is performed at the last-hop MFE. As described in detail above, this prevents the need to share middlebox state (e.g., firewall state, IP mapping for network address translation, etc.) between distributed middlebox elements operating at the hosts alongside the MFEs.

Figure 17:
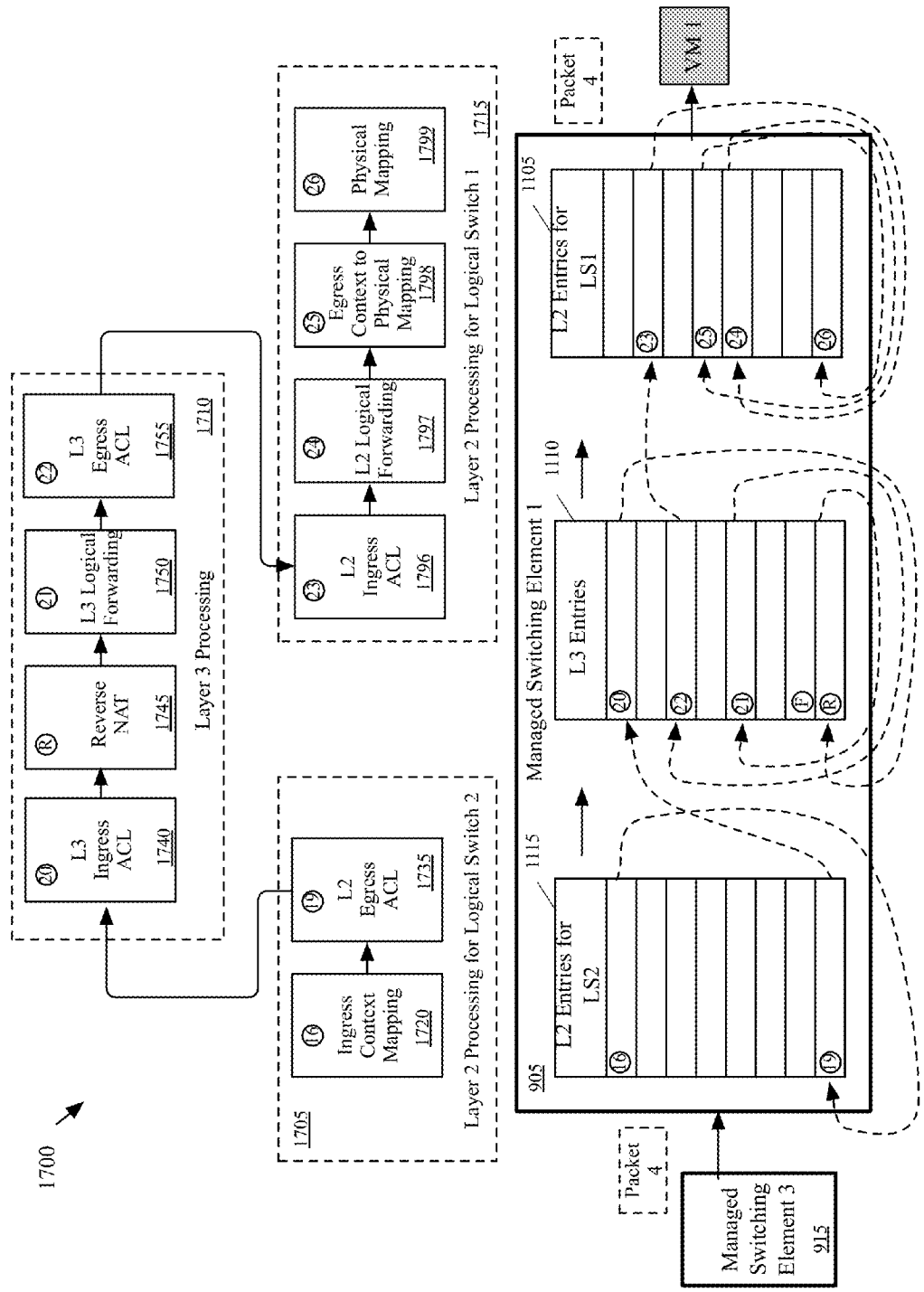
FIG. 17 conceptually illustrates an example operation of the last-hop MFE processing reverse direction packets.

FIG. 17 conceptually illustrates an example operation of the last-hop MFE 905 processing response packets. Specifically, the MFE 905 receives and processes the modified packet sent by the MFE 915 in the example of FIG. 16. Initially, the MFE 905 performs the L2 processing pipeline 1705 for logical switch 2. The MFE 905 performs ingress context mapping (stage 1720) to identify the logical egress port stored with the packet, as determined at the first-hop MFE 915 for the packet. In addition, the MFE performs the L2 egress ACL (stage 1735) to ensure that the packet should be allowed through logical port 4 to the logical router.

The MFE 905 then performs the L3 processing pipeline 1710 for the logical router. After the L3 ingress ACL (stage 1740) to ensure that the packet should be allowed to enter through port Y, the MFE identifies the reverse SNAT flow entry installed by the distributed SNAT element, indicated by the encircled R. In some embodiments, the packet matches the record R, the generation of which is described above by reference to FIG. 11, based on its destination IP address matching that chosen as the public IP for VM 1 by the distributed SNAT element 920. The reverse SNAT flow entry modifies the destination IP address of the packet to that of VM 1. Specifically, the destination IP of 11.0.1.1 is replaced with the IP address 10.0.1.1. By using a flow entry for this modification of the packet, the MFE does not have to expend the resources necessary for sending the packet to the distributed SNAT element 920 and receiving the modified packet back from the SNAT element. Next, the MFE performs logical L3 forwarding (stage 1750) based on the modified destination IP (10.0.1.1), which maps to logical port X, and L3 egress ACL (stage 1755) to ensure that the packet should be allowed to exit the logical router through port X. In addition, the logical forwarding modifies the MAC addresses of the packet, so that the source MAC is that of the logical router's attachment to logical switch 1 (01:01:01:01:01:01) and the destination MAC is that of VM 1.

Lastly, the MFE 905 performs the logical L2 processing 1715 for logical switch 1. This includes L2 ingress ACL (stage 1796), logical L2 forwarding (stage 1797) to forward the packet based on the destination MAC address (which forwards the packet to logical port 1), L2 egress ACL (stage 1798), and physical mapping (stage 1799) to map logical port 1 to physical port C and deliver the packet to VM 1 through this interface.

F. More Complex Networks

The above example illustrates the use of reverse hint and IP address conflict resolution in a simple logical network. In some embodiments, managed forwarding elements may receive packets for a particular VM on a first logical switch that may or may not have had source NAT applied. For instance, VMs on both second and third logical switches, only one of which uses source NAT, might send packets to the first logical switch. In some such embodiments, the managed forwarding elements always perform conflict resolution operations for packets before delivery, irrespective of the origin of the packets.

Figure 18:
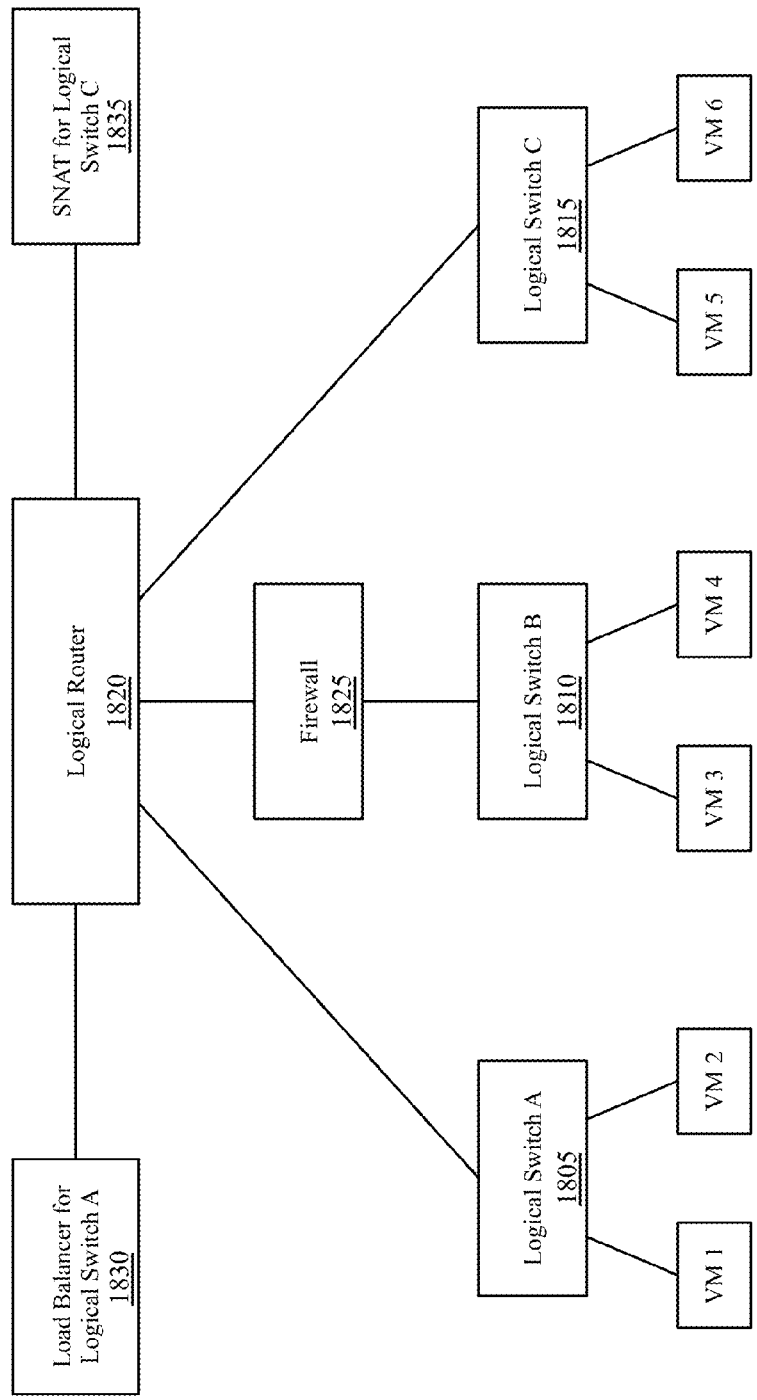
FIG. 18 illustrates a more complex logical network of some embodiments.

FIG. 18 illustrates a more complex logical network 1800 of some embodiments. The logical network 1800 includes three logical switches 1805-1815, each with two VMs attached. These three logical switches are connected via a logical router 1820. Between the second logical switch 1810 and the logical router 1820 is a firewall 1825. In addition, connected to the logical router are a load balancer 1830 that balances packets between the VMs 1 and 2 of logical switch 1805, and a logical SNAT 1835 that translates source IP addresses for packets sent by the VMs 5 and 6 of logical switch 1815. The firewall located between the logical router 1820 and the logical switch 1810 receives all packets sent between these logical elements.

Figure 19:
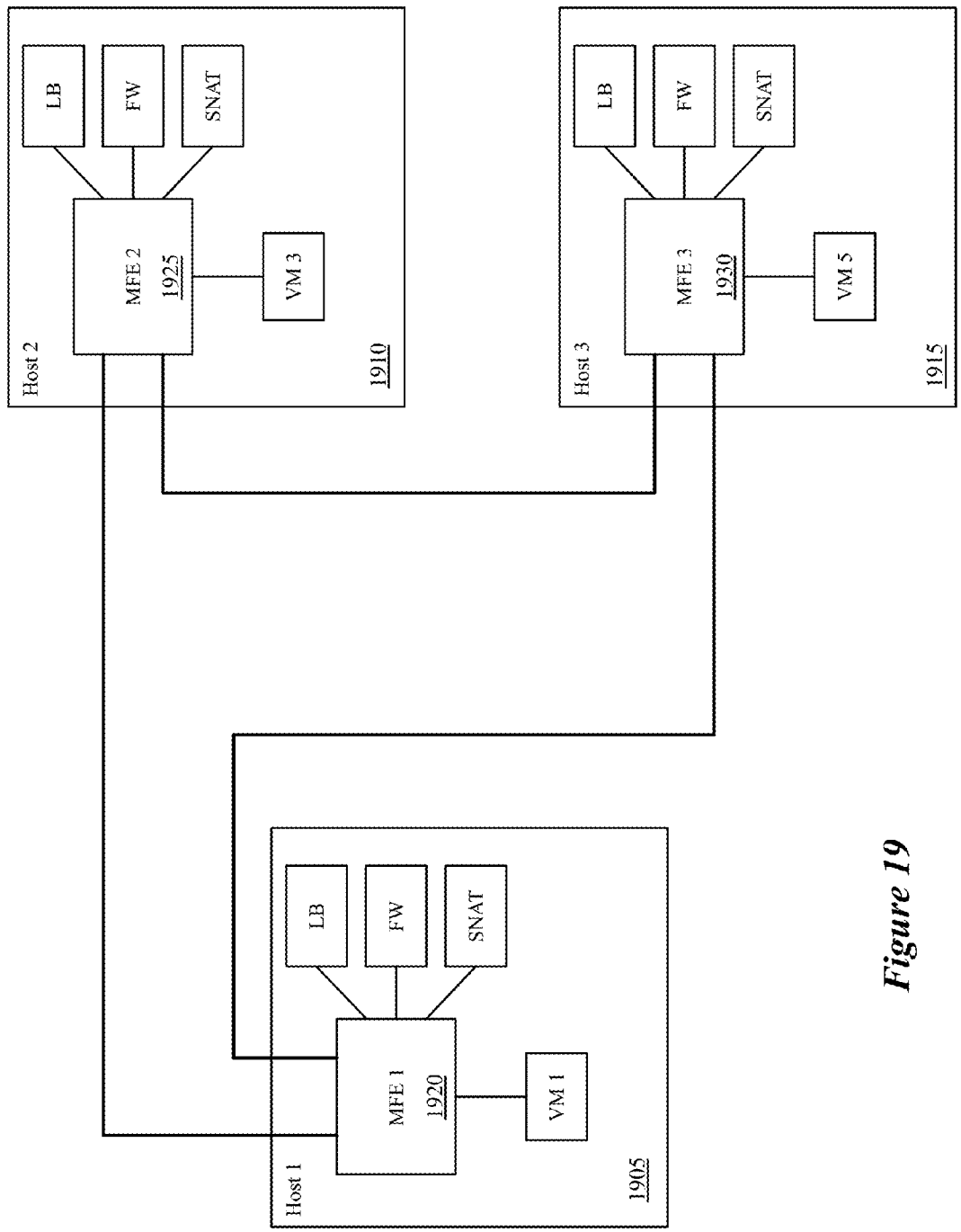
FIG. 19 illustrates the physical implementation of a portion of the logical network of FIG. 18.

FIG. 19 illustrates the physical implementation of a portion of the logical network 1800. Specifically, this figure illustrates three hosts 1905-1915, which host VMs 1, 3, and 5 respectively. In addition, each host includes an MFE; MFE 1920 at the first host 1905, MFE 1925 at the second host 1910, and MFE 1930 at the third host 1915. In some embodiments, each of these MFEs implements all three logical switches 1805-1815, as first-hop processing (and last hop-processing for reverse direction packets) mandates that each MFE not only have flow entries that implement the logical switches for local VMs, but all logical forwarding elements that packets sent from its local VMs might traverse.

Similarly, each of the hosts 1905-1915 includes a distributed load balancer element to implement load balancer 1830, distributed firewall element to implement firewall 1825, and distributed SNAT element to implement SNAT 1835. Just as packets sent by VM 1 might need to traverse logical switches 1810 and 1815, these packets might need to be sent to the firewall 1825. In addition, some embodiments implement the load balancer and SNAT on all of the hosts, even though packets processed by the MFE 1920 should generally not require use of the load balancer 1830. On the other hand, some embodiments do not implement these on hosts where they will not be necessary.

In this example, a packet sent from VM 5 on host 1915 to a VM on logical switch 1805 (using the known IP address for the load balancer 1830) will have several stages of logical processing performed on the host 1915. First, the processing pipeline for the logical switch 1815 forwards the packet to the logical router 1820, which routes the packet to the distributed SNAT element on the host based on the source IP address. This element modifies the source IP address and sends the packet back to the MFE 1930 to continue the implementation of the logical router 1820. The logical router processing then sends the packet to the local load balancer element based on the destination IP address, which selects a destination IP of either VM 1 or VM 2 and modifies the destination IP address of the packet. At this point, the MFE 1930 routes the packet to the logical switch 1805, identifies the destination MAC address of VM 1, and sends the packet over a tunnel to the MFE 1920 at the host 1905.

The MFE 1920 receives this packet through the tunnel and generates a reverse hint to send response packets back through the tunnel to MFE 1930 for logical network processing. The MFE completes the logical processing pipeline, then performs connection conflict resolution for the packet. If a conflict is detected (e.g., because a connection already exists with VM 6 using the same source IP address and port number), the MFE 1920 modifies the packet as necessary and generates flow entries for future packets in the connection.

If the VM 3 on host 1910 sends a packet to a VM on logical switch 1805 (again using the known IP address for the load balancer 1830), the processing at the host 1910 will be similar. The MFE 1925 performs the logical processing for the switch 1810, which logically forwards the packet to the firewall 1825. Thus, the packet leaves the MFE 1925 for the local firewall element, then returns for logical router processing. This processing sends the packet to the local load balancer element based on the destination IP address, which selects a destination IP address of either VM 1 or VM 2 and modifies the packet. In this case, VM 1 is again chosen, and the MFE 1925 routes the packet to the logical switch 1805, identifies the destination MAC address of VM 1, and sends the packet over a tunnel to the MFE 1920 at the host 1905.

The MFE 1920 receives the packet through a different tunnel. In some embodiments, although no SNAT was performed on the packet, the MFE 1920 nevertheless performs a conflict resolution check on the packet. The packet should not register a conflict, as no SNAT was performed on the packet. After performing any necessary conflict resolution, and generating a reverse hint flow entry, the MFE 1920 delivers the packet to the VM 1.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 20:
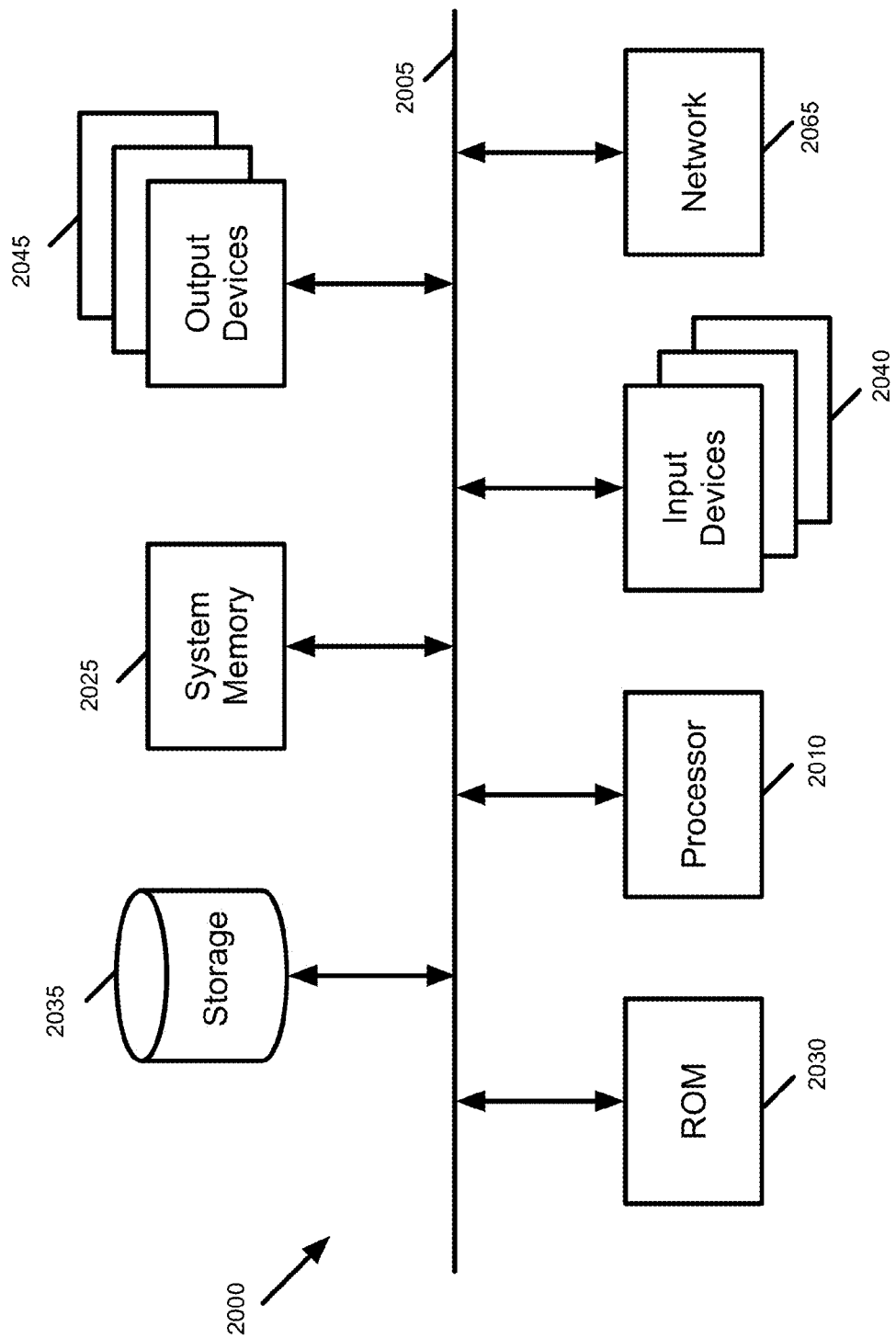
FIG. 20 conceptually illustrates an electronic system with which some embodiments of the invention are implemented.

FIG. 20 conceptually illustrates an electronic system 2000 with which some embodiments of the invention are implemented. The electronic system 2000 can be used to execute any of the control, virtualization, or operating system applications described above. The electronic system 2000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2000 includes a bus 2005, processing unit(s) 2010, a system memory 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2030, the system memory 2025, and the permanent storage device 2035.

From these various memory units, the processing unit(s) 2010 retrieve instructions to execute and data to process in order to execute the processes of the invention. The processing unit(s) may be a single processor or a multi-core processor in different embodiments.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive) as the permanent storage device 2035.

Other embodiments use a removable storage device (such as a floppy disk, flash drive, etc.) as the permanent storage device. Like the permanent storage device 2035, the system memory 2025 is a read-and-write memory device. However, unlike storage device 2035, the system memory is a volatile read-and-write memory, such a random access memory. The system memory stores some of the instructions and data that the processor needs at runtime. In some embodiments, the invention's processes are stored in the system memory 2025, the permanent storage device 2035, and/or the read-only memory 2030. From these various memory units, the processing unit(s) 2010 retrieve instructions to execute and data to process in order to execute the processes of some embodiments.

The bus 2005 also connects to the input and output devices 2040 and 2045. The input devices enable the user to communicate information and select commands to the electronic system. The input devices 2040 include alphanumeric keyboards and pointing devices (also called "cursor control devices"). The output devices 2045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 20, bus 2005 also couples electronic system 2000 to a network 2065 through a network adapter (not shown). In this manner, the computer can be a part of a network of computers (such as a local area network ("LAN"), a wide area network ("WAN"), or an Intranet, or a network of networks, such as the Internet. Any or all components of electronic system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 10 and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

We claim:

1. For a first managed forwarding element that implements logical forwarding elements of a logical network, the logical network comprising at least one middlebox, a method comprising:

receiving a first packet from a second managed forwarding element, the first packet comprising context information indicating a logical network destination that maps to a physical destination connected to the first managed forwarding element;

at the first managed forwarding element, dynamically generating a flow entry for processing subsequent packets received by the first managed forwarding element from the physical destination and sent to a source of the first packet; and processing a second packet received by the first managed forwarding element from the physical destination with the dynamically generated flow entry, wherein the dynamically generated flow entry specifies to send the second packet to the second managed forwarding element before logically forwarding the second packet through the logical network.

2. The method of claim 1, wherein dynamically generating the flow entry comprises using values from the first packet to fill in a flow template.

3. The method of claim 1, wherein the second managed forwarding element processes the first packet to add the context information.

4. The method of claim 3, wherein the processing by the second managed forwarding element comprises sending the first packet to a first middlebox element that implements the middlebox of the logical network on a same host machine as the second managed forwarding element, wherein the first middlebox element generates state information for a connection between the source and destination of the first packet.

5. The method of claim 4, wherein the connection is a transport layer connection.

6. The method of claim 4, wherein the middlebox is a firewall and the state information comprises information regarding opening of the connection between the source and destination.

7. The method of claim 4, wherein the middlebox is source network address translation (SNAT) and the state information comprises a mapping of a first network layer address to a second network layer address.

8. The method of claim 4, wherein the state information is not shared with a second middlebox element on a same host machine as the first managed forwarding element.

9. The method of claim 1 further comprising:

receiving a third packet from the physical destination that does not match the dynamically generated flow entry; and processing the third packet by logically forwarding the packet through the logical network before sending the third packet to a third managed forwarding element.

10. The method of claim 1, wherein logical network packets that do not match a dynamically generated flow entry are logically forwarded by an initial managed forwarding element.

11. The method of claim 1, wherein the dynamically generated flow entry matches the second packet based on a 5-tuple of source and destination IP addresses, source and destination port numbers, and transport layer protocol.

12. The method of claim 1, wherein the first managed forwarding element comprises a forwarding table with a plurality of flow entries received from a network controller, wherein the dynamically generated flow entry is added to the forwarding table.

13. For a first managed forwarding element that implements logical forwarding elements of a logical network, the logical network comprising a middlebox, the first managed forwarding element operating in a host machine, a method comprising:
   processing a first packet received directly from a source machine of the first packet at the first managed forwarding element by (i) identifying the middlebox as a logical egress port of a first logical forwarding element and (ii) forwarding the first packet to a distributed middlebox element implementing the middlebox in the host machine, wherein the distributed middlebox element generates state information for a connection between the source of the first packet and a destination machine of the first packet;
   processing a second packet received from the distributed middlebox element by (i) identifying the destination machine as a logical egress port of a second logical forwarding element and (ii) forwarding the second packet to a second managed forwarding element to which the destination machine connects; and
   receiving a third packet from the second managed forwarding element, wherein the second managed forwarding element did not identify a logical egress port of the first logical forwarding element for the packet in order for the first managed forwarding element to perform logical network processing and send the third packet to the distributed middlebox element with the generated state information for the connection.

14. The method of claim 13, wherein the first and second packets have a same set of characteristics.

15. The method of claim 13, wherein the source machine of the first packet, the first managed forwarding element, and the distributed middlebox element all reside on the host machine.

16. The method of claim 13, wherein the second managed forwarding element resides on a second host machine along with a second distributed middlebox element that implements the middlebox of the logical network, wherein the second distributed middlebox element does not receive the generated state information for the connection.

17. The method of claim 13, wherein the second managed forwarding element uses a flow entry dynamically generated while processing the second packet in order to send the third packet to the first managed forwarding before identifying a logical egress port of the first logical forwarding element.

18. The method of claim 17, wherein the second managed forwarding element identifies a logical egress port of a particular logical switch before sending the third packet to the first managed forwarding element.

19. For a network controller, a method for managing a logical network that comprises a plurality of logical forwarding elements and a middlebox, the method comprising:
   generating a first set of flow entries for a first managed forwarding element, the first set of flow entries for use by the first managed forwarding element to perform logical forwarding to implement the plurality of logical forwarding elements when processing packets for which the first managed forwarding element is a first hop, wherein at least one of the flow entries of the first set specifies for the first managed forwarding element to forward a packet to a distributed middlebox element that implements the middlebox of the logical network;
   generating a second set of flow entries for a second managed forwarding element, the second set of flow entries for use by the second managed forwarding element to perform logical forwarding to implement the plurality of logical forwarding elements when processing packets for which the second managed forwarding element is a first hop; and
   generating a particular flow entry for the second managed forwarding element, the particular flow entry specifying for the second managed forwarding element to dynamically generate a new flow entry before delivering a packet received from the first managed forwarding element to a particular machine connected to the second managed forwarding element, wherein the new flow entry specifies for the second managed forwarding element to send packets received from the particular machine with a particular destination address to the first managed forwarding element without using the second set of flow entries to perform logical forwarding for the packets.

20. The method of claim 19, wherein the new flow entry specifies for the second managed forwarding element to send a particular packet to the first managed forwarding element without using the second set of flow entries when the particular packet matches a transport connection 5-tuple.

21. The method of claim 20, wherein the transport connection 5-tuple comprises a source network layer address, destination network layer address, source transport port number, destination transport port number, and transport protocol.

22. The method of claim 19 further comprising distributing the first set of flow entries to the first managed forwarding element and the second set of flow entries to the second managed forwarding element.

23. The method of claim 19 further comprising distributing a same middlebox configuration to a first distributed middlebox element operating at a first host machine with the first managed forwarding element and a second distributed middlebox element operating at a second host machine with the second managed forwarding element.

* * * * *